United States Patent
Pmsvvsv et al.

(10) Patent No.: US 11,637,507 B2
(45) Date of Patent: Apr. 25, 2023

(54) METHODS OF FUEL CELL OPERATION WITH BI-DIRECTIONAL INVERTERS

(71) Applicant: BLOOM ENERGY CORPORATION, San Jose, CA (US)

(72) Inventors: Prasad Pmsvvsv, Sunnyvale, CA (US); Beau Baker, Sunnyvale, CA (US); Craig Metcho, Philadelphia, PA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/317,759

(22) Filed: May 11, 2021

(65) Prior Publication Data

US 2021/0359623 A1 Nov. 18, 2021

Related U.S. Application Data

(60) Provisional application No. 63/026,222, filed on May 18, 2020.

(51) Int. Cl.
*H02M 7/797* (2006.01)
*H02M 7/537* (2006.01)
(Continued)

(52) U.S. Cl.
CPC ......... *H02M 7/797* (2013.01); *H01M 8/1253* (2013.01); *H02J 9/062* (2013.01); *H02M 7/537* (2013.01); *H01M 2008/1293* (2013.01)

(58) Field of Classification Search
CPC .... H02M 7/797; H02M 7/537; H02M 1/0083; H02M 5/4585; H02M 7/81;
(Continued)

(56) References Cited

U.S. PATENT DOCUMENTS

| 8,440,362 B2 | 5/2013 | Richards et al. |
| 8,970,176 B2 | 3/2015 | Ballantine et al. |

(Continued)

FOREIGN PATENT DOCUMENTS

| EP | 3190682 A1 | 7/2017 |
| KR | 10-2018-0045965 A | 5/2018 |
| WO | WO2019-089886 A2 | 5/2019 |

OTHER PUBLICATIONS

Notification of Transmittal of the International Search Report and the Written Opinion of the International Searching Authority for International Patent Application No. PCTUS2021/031676, dated Aug. 30, 2021, 9 pages.

(Continued)

*Primary Examiner* — Toan T Vu
(74) *Attorney, Agent, or Firm* — The Marbury Law Group PLLC

(57) ABSTRACT

A microgrid system includes first and second DC power sources electrically connected to respective first and second DC electrical power busses, a first uninterruptable power module electrically connected to the first DC electrical power bus and configured to be connected to an alternating current (AC) load, a second uninterruptable power module electrically connected to the second DC electrical power bus and configured to be connected to the AC load, a first bi-directional AC/DC inverter having a DC end and an AC end, where the first DC electrical power bus is connected to the DC end of the first bi-directional AC/DC inverter, a second bi-directional AC/DC inverter having DC and AC ends, where the second DC electrical power bus is connected to the DC end of the second bi-directional AC/DC inverter, and an AC electrical power bus electrically connected to the first and second bi-directional AC/DC inverters at their AC ends.

23 Claims, 10 Drawing Sheets

(51) Int. Cl.
*H02J 9/06* (2006.01)
*H01M 8/1253* (2016.01)
*H01M 8/12* (2016.01)

(58) Field of Classification Search
CPC ....... H01M 8/1253; H01M 2008/1293; H01M 8/249; H02J 9/062; H02J 9/06; Y02E 60/50
See application file for complete search history.

(56) References Cited

U.S. PATENT DOCUMENTS

| | | | |
|---|---|---|---|
| 9,106,098 B2 | 8/2015 | Srinivasan et al. | |
| 9,190,693 B2 | 11/2015 | Sridhar et al. | |
| 9,214,812 B2 | 12/2015 | Ballantine et al. | |
| 9,362,815 B2 | 6/2016 | Gurunathan et al. | |
| 9,461,320 B2 | 10/2016 | Ballantine et al. | |
| 9,639,130 B2 | 5/2017 | Gurunathan et al. | |
| 9,698,598 B2 | 7/2017 | Ballantine et al. | |
| 9,972,852 B2 | 5/2018 | Ballantine et al. | |
| 10,873,099 B1 | 12/2020 | Gurunathan et al. | |
| 2009/0230689 A1* | 9/2009 | Burra | H02J 3/381 290/55 |
| 2011/0148205 A1 | 6/2011 | Moon | |
| 2011/0281185 A1 | 11/2011 | Sridhar et al. | |
| 2012/0013193 A1* | 1/2012 | Sato | H02J 9/062 307/80 |
| 2012/0098336 A1 | 4/2012 | Gurunathan et al. | |
| 2012/0146587 A1 | 6/2012 | Srinivasan et al. | |
| 2012/0267952 A1 | 10/2012 | Ballantine et al. | |
| 2012/0326504 A1 | 12/2012 | Ballantine et al. | |
| 2012/0326668 A1 | 12/2012 | Ballantine et al. | |
| 2014/0009003 A1 | 1/2014 | Ballantine et al. | |
| 2015/0194685 A1* | 7/2015 | Ballantine | H01M 8/0687 429/444 |
| 2015/0228990 A1 | 8/2015 | Ballantine et al. | |
| 2015/0288220 A1 | 10/2015 | Gurunathan et al. | |
| 2017/0005480 A1 | 1/2017 | Ballantine et al. | |
| 2017/0077535 A1 | 3/2017 | Sudhan et al. | |
| 2017/0331325 A1 | 11/2017 | Ristau | |
| 2017/0338502 A1 | 11/2017 | Pmsvvsv et al. | |
| 2018/0123496 A1 | 5/2018 | Ilic et al. | |
| 2018/0198282 A1 | 7/2018 | Hun et al. | |
| 2018/0331397 A1* | 11/2018 | Yamaai | H02J 7/34 |
| 2018/0331611 A1 | 11/2018 | Featherly et al. | |
| 2019/0204391 A1 | 7/2019 | Cottuli | |
| 2019/0229535 A1 | 7/2019 | Pmsvvsv et al. | |
| 2019/0312432 A1 | 10/2019 | Gurunathan et al. | |
| 2019/0312441 A1 | 10/2019 | Ballantine et al. | |
| 2020/0212459 A1 | 7/2020 | Ballantine et al. | |
| 2020/0266658 A1 | 8/2020 | Cottuli et al. | |

OTHER PUBLICATIONS

Notification of Transmittal of the International Search Report and Written Opinion of the International Search Authority for International Patent Application No. PCT/US2020/018589, dated Jun. 12, 2020, 10 pages.
U.S. Appl. No. 17/098,797, filed Nov. 16, 2020, Bloom Energy Corporation.
U.S. Appl. No. 17/176,894, filed Feb. 16, 2021, Bloom Energy Corporation.

* cited by examiner

METHODS OF FUEL CELL OPERATION WITH BI-DIRECTIONAL INVERTERS

FIELD

The present invention is generally directed to power generation systems and, in particular, to a fuel cell system that efficiently manages fuel cell power output to address degradation of fuel cell system power supply using bi-directional inverters.

BACKGROUND

Electrochemical devices, such as fuel cells, can convert energy stored in fuels to electrical energy with high efficiencies. In a fuel cell system, such as a solid oxide fuel cell (SOFC) system, an oxidizing flow is passed through the cathode side of the fuel cell while a fuel inlet flow is passed through the anode side of the fuel cell. The oxidizing flow is typically air, while the fuel flow can be a hydrocarbon fuel, such as methane, natural gas, pentane, ethanol, or methanol. The fuel cell enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

SUMMARY

According to one embodiment, a microgrid system includes a first DC power source electrically connected to a first DC electrical power bus, a second direct current (DC) power source electrically connected to a second (DC) electrical power bus, a first uninterruptable power module electrically connected to the first DC electrical power bus and configured to be connected to an alternating current (AC) load, a second uninterruptable power module electrically connected to the second DC electrical power bus and configured to be connected to the AC load, a first bi-directional AC/DC inverter having a DC end and an AC end, wherein the first DC electrical power bus is connected to the DC end of the first bi-directional AC/DC inverter, a second bi-directional AC/DC inverter having a DC end and an AC end, wherein the second DC electrical power bus is connected to the DC end of the second bi-directional AC/DC inverter, and an AC electrical power bus electrically connected to the first and the second bi-directional AC/DC inverters at their AC ends.

According to another embodiment, a microgrid system comprises a first direct current (DC) power source electrically connected to a first DC electrical power bus, a second DC power source electrically connected to a second DC electrical power bus, a first uninterruptable power module electrically connected to the first DC electrical power bus and configured to be connected to an alternating current (AC) load via at least one load electrical power bus, a second uninterruptable power module electrically connected to the second DC electrical power bus and configured to be connected to the AC load via the at least one load electrical power bus, a first AC/DC inverter having a DC end and an AC end, wherein the first DC electrical power bus is connected to the DC end of the first AC/DC inverter, a second AC/DC inverter having a DC end and an AC end, wherein the second DC electrical power bus is connected to the DC end of the second AC/DC inverter, an automatic transfer switch (ATS) having a load terminal, an emergency terminal, and a normal terminal configured to be connected to an electrical power utility grid, a first AC electrical power bus electrically connected to the first and the second AC/DC inverters at their AC ends, and electrically connected to the load terminal of the ATS, and a second AC electrical power bus electrically connected to the emergency terminal of the ATS and to the at least one load electrical power bus.

DETAILED DESCRIPTION

Figure 1:
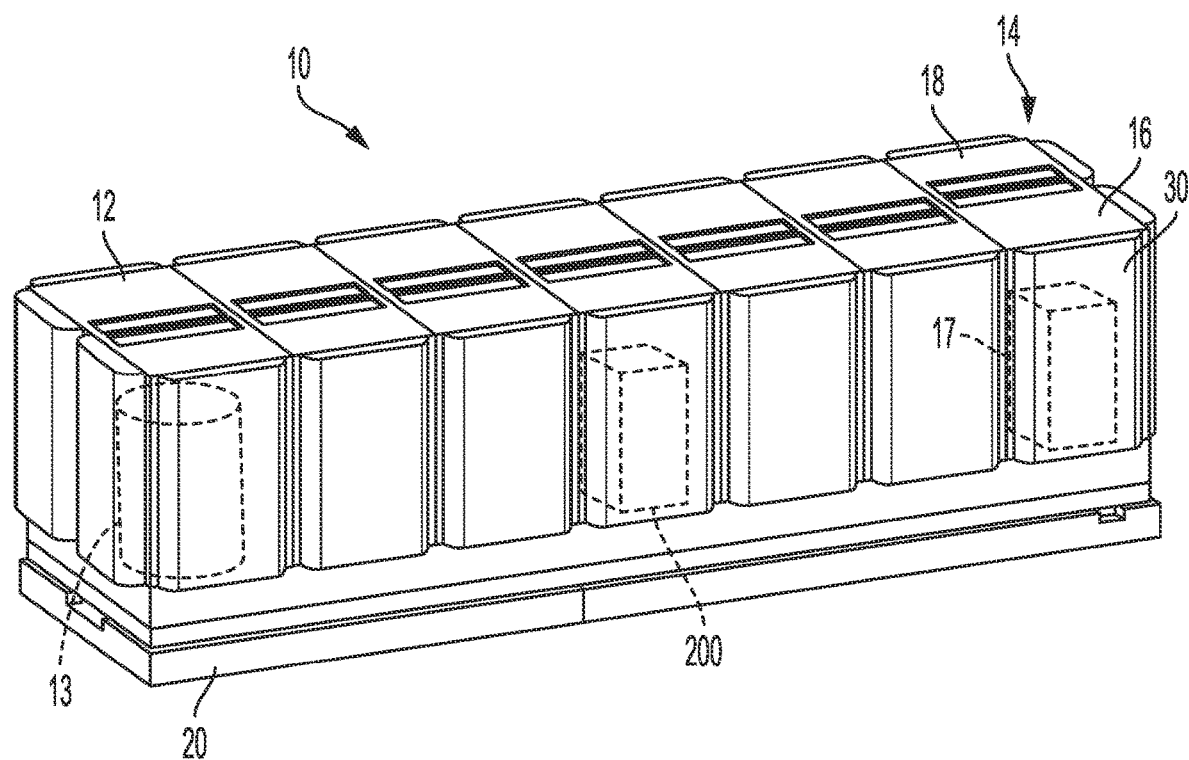
FIG. 1 is a perspective view of a fuel cell system according to various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include electrical circuits, electrical components, and methods for managing a microgrid system, such as a fuel cell microgrid system to address degradation of and imbalance in fuel cell microgrid system electrical power supply. In some embodiments, the fuel cell microgrid system may be configured to selectively electrically connect parallel power module clusters via bi-directional alternating current (AC)/direct current (DC) inverters. In some embodiments, in response electrical power undersupply on a first DC electrical power bus, due to degradation and/or failure of a first power module and/or a first power module cluster, a first bi-directional AC/DC inverter may be configured to selectively electrically connect the first DC electrical power bus to an AC electrical power bus. The first bi-directional AC/DC inverter may be configured to import and rectify AC electrical power from the AC electrical power bus to provide DC electrical power to the first DC electrical power bus. In some embodiments, the AC electrical power imported by the first bi-directional AC/DC inverter may include AC electrical power from an electrical power utility grid. In some embodiments, in response to electrical power oversupply on a second DC electrical power bus, generated by a second power module cluster, a second bi-directional AC/DC inverter may be configured to selectively electrically connect the second DC electrical power bus to the AC electrical power bus. The second bi-directional AC/DC inverter may be configured to export and invert DC electrical power from the second DC electrical power bus to provide AC electrical power to the AC electrical power bus. In some embodiments, the AC electrical power imported by the first bi-directional AC/DC inverter may include the AC electrical power exported by the second bi-directional AC/DC inverter.

Fuel cell microgrid systems can be configured with multiple power module clusters electrically connected in parallel to a load and configured to provide equal amounts of electrical power to the load to satisfy a load demand. When any of the power module clusters cannot supply the equal amount of electrical power, for example due to degradation and/or failure of a power module of the power module cluster, the power supplied the power module clusters becomes unequal. In response, due to the imbalance in electrical power provided by each of the power module clusters, a fuel cell microgrid system can be configured to reduce the electrical power supply to the load from the power module clusters so that each power module cluster supplies a lower equal amount of electrical power to the load. The lower equal amounts of electrical power can be based on an electrical power supply of the power module cluster having a lowest electrical power generation capacity. As such, the combined electrical power supply to the load by the power module clusters is reduced. Power module clusters that can produce electrical power greater than the lower equal amount of electrical power to the load are underutilized to power the load. Load drop can occur when the load demand is higher than the combined electrical power supply of the power module clusters using the lower equal amount of electrical power.

The embodiments described herein may alleviate the foregoing issues of microgrid systems, such as fuel cell microgrid systems configured with multiple power module clusters electrically connected in parallel to a load and configured to provide equal amounts of electrical power to the load to satisfy a load demand. The microgrid system may include any number of power module clusters, such as fuel cell power module clusters and/or other power source power module clusters, electrically connected in parallel to the load, such that the multiple power module clusters may provide either equal or unequal amounts of electrical power to the load to satisfy a load demand, based on the microgrid status. The power module clusters may be electrically connected to and provide DC electrical power to DC electrical power busses. The microgrid system may include any number of bi-directional AC/DC inverters configured to selectively electrically connect the DC electrical power busses to an AC electrical power bus. Each bi-directional AC/DC inverter may be configured to export and invert DC electrical power from a DC electrical power bus to provide AC electrical power to the AC electrical power bus in response to a voltage on the DC electrical power bus greater than a threshold voltage. Each bi-directional AC/DC inverter may be further configured to import and rectify AC electrical power from the AC electrical power bus to provide DC electrical power to a DC electrical power bus in response to a voltage on the DC electrical power bus less than a threshold voltage. In some embodiments, the threshold voltage may be a voltage at which equal electrical power supply from each of the power module clusters may satisfy the load demand. In some embodiments, the threshold voltage may be a static value. In some embodiments, the threshold voltage may be a dynamic value based on the load demand. In some embodiments, the AC electrical power imported by a bi-directional AC/DC inverter from the AC electrical power bus may include AC electrical power exported by another bi-directional AC/DC inverter to the AC electrical power bus.

In some embodiments, the microgrid system may be a standalone fuel cell microgrid system, such that the fuel cell microgrid system is not electrically connected to an electrical power utility grid. In some embodiments, the microgrid system may be electrically connectable or selectively electrically connectable to an electrical power utility grid. In some embodiments, the AC electrical power exported by a bi-directional AC/DC inverter to the AC electrical power bus may be provided to the electrical power utility grid. In some embodiments, the AC electrical power imported by a bi-directional AC/DC inverter from the AC electrical power bus may include AC electrical power provided by the electrical power utility grid. In some embodiments, the AC electrical power exported by a bi-directional AC/DC inverter to the AC electrical power bus may be provided to an auxiliary electrical power storage unit, and the AC electrical power imported by a bi-directional AC/DC inverter from the AC electrical power bus may be provided by the auxiliary electrical power storage unit. In some embodiments, excess AC electrical power on the AC electrical power bus may be dissipated by an electrical power dissipation unit, such as a resistor load.

FIG. 1 illustrates an example of one DC electrical power source, which comprises modular fuel cell system that is more fully described in U.S. Pat. No. 8,440,362, incorporated herein by reference for descriptions of the modular fuel cell system. The modular system may contain modules and components described above as well as in U.S. Pat. No. 9,190,693, which is incorporated herein by reference for descriptions of the modular fuel cell system. The modular design of the fuel cell system enclosure 10 provides flexible system installation and operation.

The modular fuel cell system enclosure 10 includes a plurality of power module housings 12 (containing a fuel cell power module components), one or more fuel input (i.e., fuel processing) module housings 16, and one or more power conditioning (i.e., electrical output) module housings 18. For example, the system enclosure may include any desired number of modules, such as 2-30 power modules, for example 6-12 power modules. FIG. 1 illustrates a system enclosure 10 containing six power modules (one row of six modules stacked side to side), one fuel processing module, and one power conditioning module, on a common base 20. Each module may comprise its own cabinet or housing. Alternatively, the power conditioning and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power, electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in an example embodiment in FIG. 1, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may include more than one row of modules 12. For example, as noted above, the system may include two rows of power modules stacked back to back.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door 30 to module 14 may be on the side rather than on the front of the cabinet.

Figure 2:
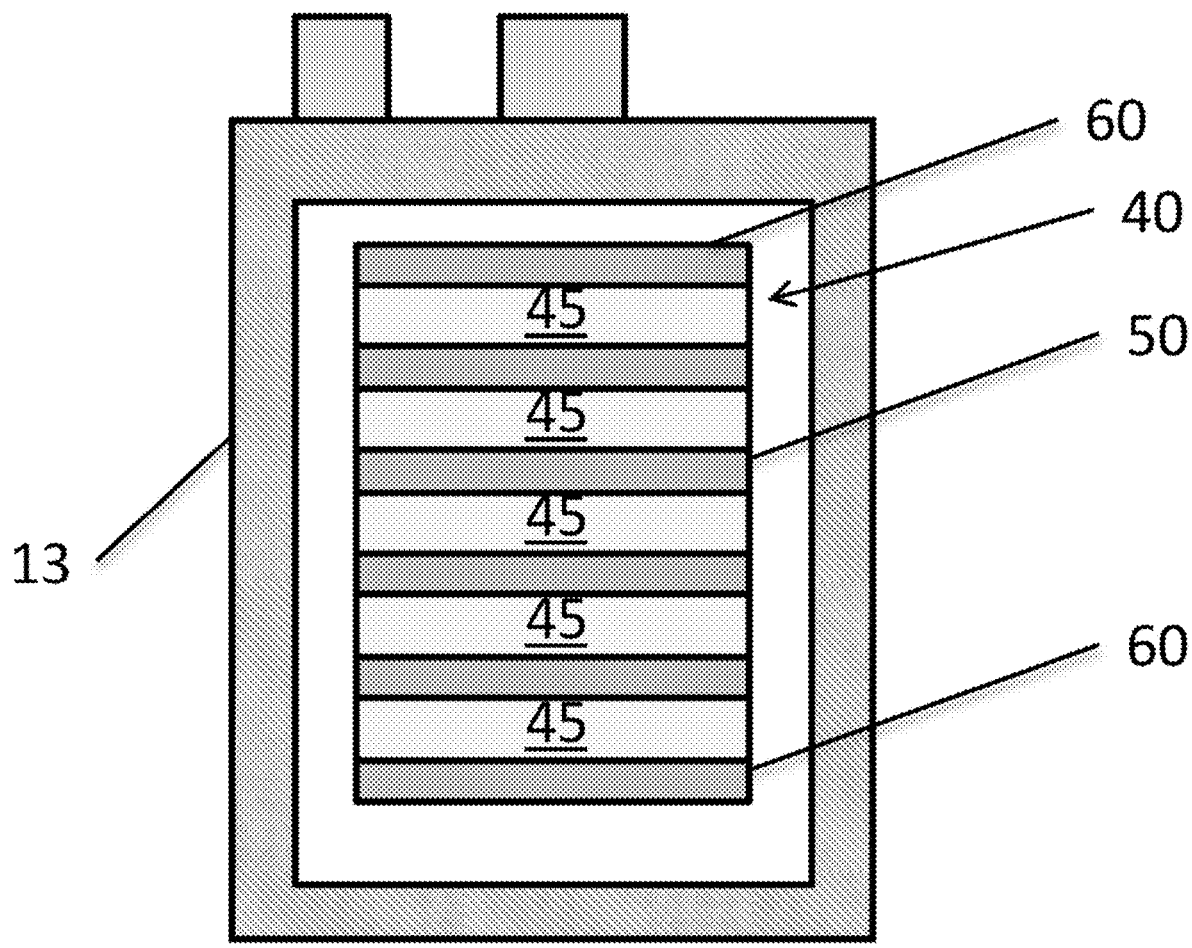
FIG. 2 is a schematic side cross-sectional view of a hot box according to various embodiments.

FIG. 2 illustrates a plan view of a fuel cell system hotbox 13 including a fuel cell stack or column 40. The hotbox 13 is shown to include the fuel cell stack or column 40. However, the hotbox 13 may include two or more of the stacks or columns 40. The stack or column 40 may include the electrically connected fuel cells 45 stacked on one another, with the interconnects 50 disposed between the fuel cells 45. The first and last fuel cells 45 in the stack or column are disposed between a respective end plate 60 and interconnect 50. The end plates 60 are electrically connected to electrical outputs of the fuel cell stack or column 40. The hotbox 13 may include other components, such as fuel conduits, air conduits, seals, electrical contacts, etc., and may be incorporated into a fuel cell system including balance of plant components. The fuel cells 45 may be solid oxide fuel cells containing a ceramic electrolyte, such as yttria stabilized zirconia (YSZ) or scandia stabilized zirconia (SSZ), an anode electrode, such as a nickel-YSZ, a Ni-SSZ or a nickel-samaria doped ceria (SDC) cermet, and a cathode electrode, such as lanthanum strontium manganite (LSM)). The interconnects 50 and/or end plates 60 may comprise any suitable gas impermeable and electrically conductive material, such as a chromium-iron alloy, such as an alloy containing 4 to 6 wt % iron and balance chromium. The interconnects 50 electrically connect adjacent fuel cells 45 and provide channels for fuel and air to reach the fuel cells 45.

Fuel cell systems, such as modular fuel cell system enclosure 10, may include and/or be augmented by various pieces of support equipment. Support equipment may include various auxiliary equipment and systems to support the operation of the fuel cell system. Support equipment may vary based on constraints and/or features at a site where the fuel cell system is installed. As non limiting examples, support equipment may include, fuel support equipment, air support equipment, and/or ventilation support equipment. One type of fuel support equipment may include equipment configured to control supply and/or exhaust fuel pressure in the fuel cell system, such as a fuel blower or pump to supply fuel to, recycle fuel/exhaust in, and/or exhaust fuel from the fuel cell system. Another type of fuel support equipment may be configured to process fuel for the fuel cell system, such as a fuel pre-heater, exhaust scrubber, etc. Other types of fuel support equipment may also be used. One type of air support equipment may be air supply equipment configured to provide air into the fuel cell system and/or exhaust air from the fuel cell system, such as blowers or fans to provide air to and/or exhaust air from a fuel cell cathode, an anode tail gas oxidizer (ATO), an air heat exchanger, a CPOx reactor, etc. Other types of air support equipment may also be used. One type of ventilation support equipment may include equipment configured to ventilate from and/or circulate air in portions of housings external of the hot box (e.g., portions within modular fuel cell system enclosure 10 but external of the hot box 13 itself), such as a ventilation fan to blow air from within the enclosure 10 out of the enclosure 10 to maintain an acceptable enclosure 10 pressure. Other types of ventilation support equipment may also be used. Support equipment, especially support equipment including electric motors may require Alternating Current (AC) power, for example one, two, or three phase AC power, for operation.

Figure 3:
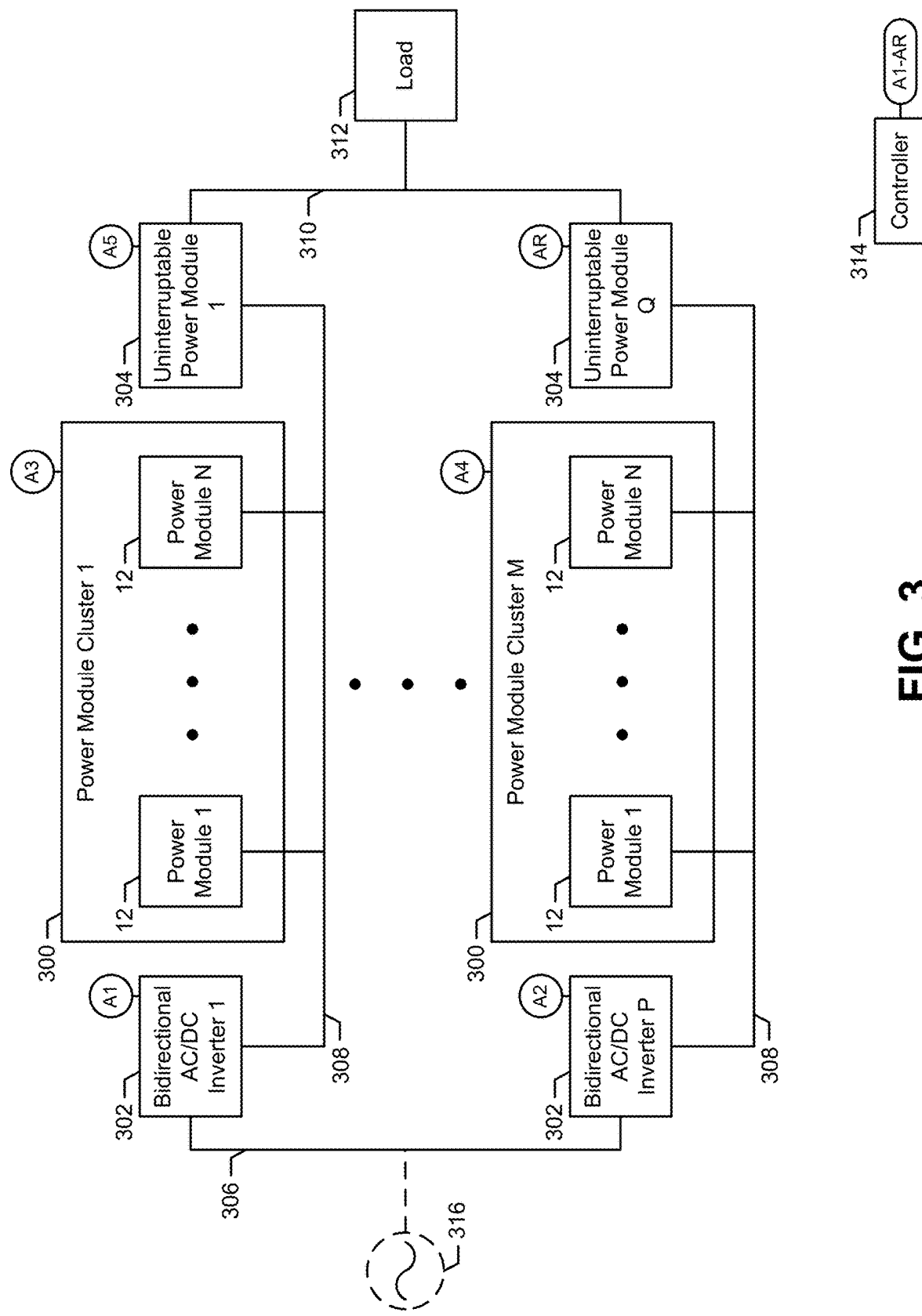
FIG. 3 is a block diagram of a fuel cell microgrid system having bi-directional inverters according to some embodiments.
Figure 4:
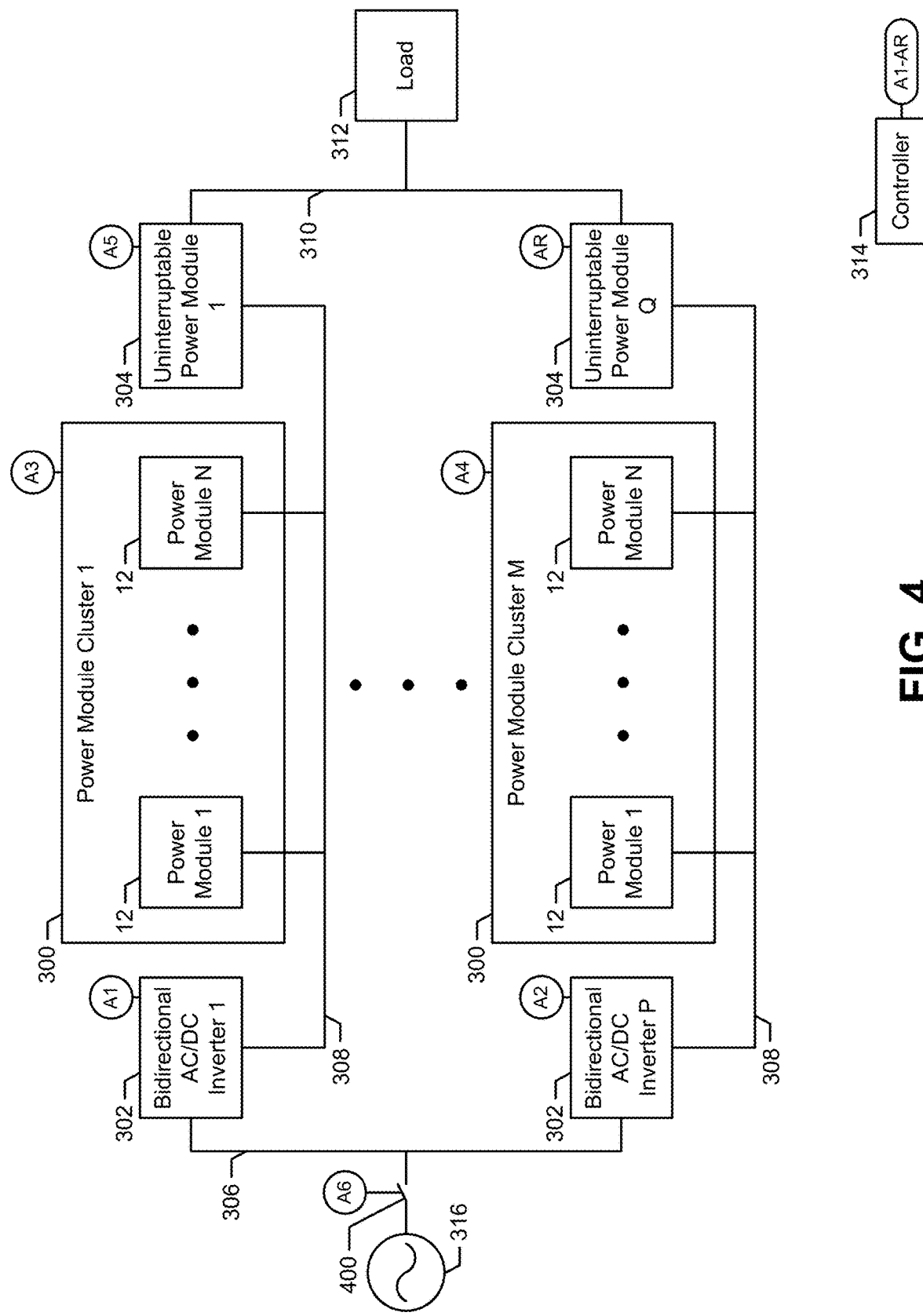
FIG. 4 is a block diagram of a fuel cell microgrid system having bi-directional inverters and configured for selective electrical power utility grid isolation according to some embodiments.
Figure 5:
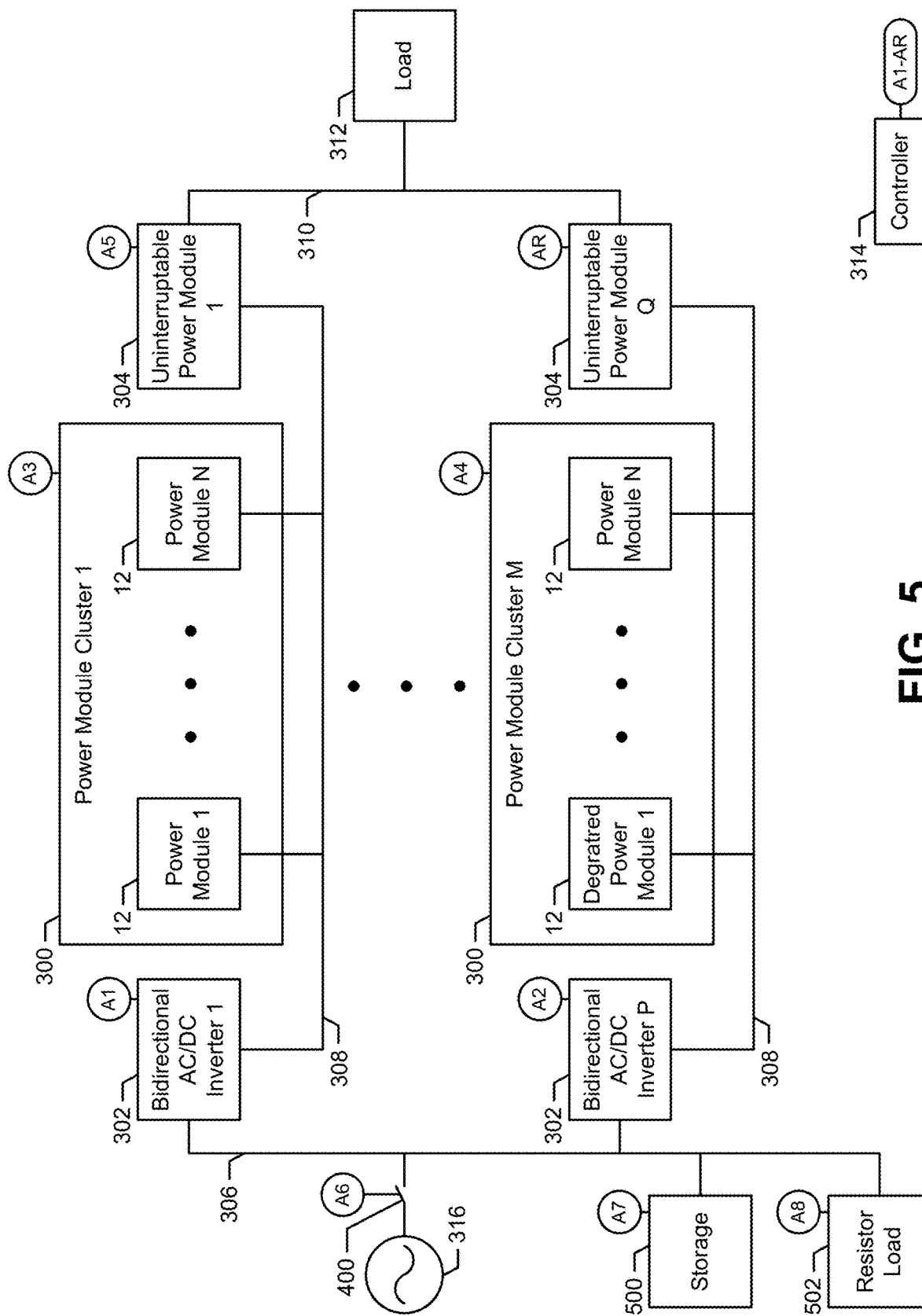
FIG. 5 is a block diagram of a fuel cell microgrid system having bi-directional inverters and auxiliary electrical power storage and/or electrical power dissipation according to some embodiments.

FIGS. 3-5 illustrate multiple embodiments of a microgrid system, such as a fuel cell microgrid system, having bi-directional AC/DC inverters. A microgrid system may include a variety of components, including any number and combination of power modules 12, power module clusters 300, bi-directional AC/DC inverters 302, uninterruptable power modules 304, AC electrical power busses 306, DC electrical power busses 308, and load electrical power busses 310. The power modules 12 may comprise fuel cell power modules described above, and/or any other type of DC power source power modules, such as solar cell power modules, etc. The microgrid system may include any number of control devices (herein also referred to as controllers) 314 configured to receive data signals from and send control signals to any number and combination of the components of the microgrid system via any number "R" of wired and/or wireless connections A1-AR. The control device(s) 314 may be any form of programmable computing device or system, such as a server or system control device, which may be configured to perform operations of various embodiments, including operations of the methods 600, 700, 800 described herein with reference to FIGS. 6-8. The microgrid system may be electrically connectable to an AC load 312 configured to operate using AC electrical power. Each uninterruptable power module 304 may be configured to provide the same amount of electrical power to the AC load 312 via a load electrical power bus 310. In some embodiments, the microgrid system may be electrically connected to an AC electrical power source, such as an electrical power utility grid 316. For simplicity, a fuel cell microgrid will be described below which includes fuel cell power modules 12. FIGS. 3-5 illustrate various embodiments that are meant to be illustrative examples and not limiting of the scope of the claims.

A fuel cell microgrid system may include any number "M" of power module clusters 300, such as 2 to 20, e.g., 2 to 6. Each power module cluster 300 may include any number of fuel cell power modules 12 that may be configured as described herein with reference to FIG. 1. In some embodiments, each power module cluster 300 may include any number "N" of power modules 12, such as 1 to 12, e.g., 5 to 10. In some embodiments, the number of power modules 12 included in a power module cluster 300 may vary between the various power module clusters 300. The power modules 12 of a single power module cluster 300 may be insufficient to generate electrical power to satisfy at least normal electrical power demands of the AC load 312. The number of power modules 12 divided among multiple power module clusters 300 in the fuel cell microgrid system may be at least as many power modules 12 necessary to generate sufficient total electrical power to satisfy at least normal electrical power demands of the AC load 312. Similarly, the number of power modules 12 divided among multiple power module clusters 300 in the fuel cell microgrid system may be at least as many power modules 12 necessary to generate an equal amount of electrical power from each power module cluster 300 to satisfy at least normal electrical power demands of the AC load 312. In various embodiments, the number of power modules 12 may include any number of redundant power modules 12 so that in case of reduced or no electrical output from at least one power module 12, a redundant power module 12 may be used to continue supply of the electrical power demand of the AC load 312.

A power module cluster 300 may be electrically connected to a respective DC electrical power bus 308 and configured to supply DC electrical power to the DC electrical power bus 308. The power module cluster 300 may be configured in a manner in which, under normal operation, such as within expected degradation parameters and/or without failure of a power module 12, the power module cluster 300 may provide at least a portion of the electrical power required to satisfy the electrical power demand of the AC load 312. Preferably, the power module cluster 300 may be configured in a manner in which, under normal operation, the power module cluster 300 may provide sufficient electrical power for a respective uninterruptable power module 304 which is electrically connected to the power module cluster 300 via the DC electrical power bus 308, to provide a same amount electrical power to the AC load 312 as the other uninterruptable power modules 304 of the fuel cell microgrid system.

An uninterruptable power module 304 may be electrically connected to a respective power module cluster 300 via a respective DC electrical power bus 308 and electrically connectable to the AC load 312 via the load electrical power bus 310. The uninterruptable power module 304 may be configured as or to include a DC/AC inverter. The uninterruptable power module 304 may be configured to invert a DC electrical power received from an electrical power source (e.g., from the power module cluster(s) 300) to an AC electrical power. The uninterruptable power module 304 may contain unidirectional DC/AC inverter, configured to receive DC electrical power at an input end and to supply AC electrical power at an output end. In some embodiments, the electrical power source may include any number and combination of a power module cluster 300 and/or a power module 12, an electrical power utility grid 316, an auxiliary electrical power storage unit 500 (shown in FIG. 5) as described further herein with reference to FIGS. 3-5. The uninterruptable power module 304 may be electrically connected at the input end to any number and combination of electrical power sources via the DC electrical power bus 308. The uninterruptable power module 304 may be electrically connectable at the output end to the AC load 312 via the load electrical power bus 310. A DC electrical power received by the uninterruptable power module 304 from one or more electrical power sources may be inverted by the uninterruptable power module 304 and supplied to the AC load 312 as an AC electrical power. In some embodiments, the uninterruptable power module 304 may be configured to supply a designated amount of electrical power having a given voltage and/or current, for example, based on electrical power configuration of the AC load 312 and/or the electrical power demand of the AC load 312. In some embodiments, each uninterruptable power module 304 of the fuel cell microgrid system may be configured to receive a same amount of input DC electrical power and output a same amount of output AC electrical power. A fuel cell microgrid system may include any number "Q" of uninterruptable power modules 304, each disposed between an electrical power source and the AC load 312. In some embodiments, a fuel cell microgrid system may include a one-to-one ratio of power module clusters 300 to uninterruptable power modules 304, such that Q=M.

A bi-directional AC/DC inverter 302 may be selectively electrically connectable to a respective power module cluster 300 via a respective DC electrical power bus 308 and selectively electrically connectable to other bi-directional AC/DC inverters 302 via an AC electrical power bus 306. The bi-directional AC/DC inverter 302 may be configured to rectify an AC electrical power received at an AC end from an electrical power source to a DC electrical power, and invert a DC electrical power received at a DC end from the power module cluster 300 and/or a power module 12 to an AC electrical power. In some embodiments, the electrical power source which provides the AC electrical power through the AC electrical power bus may include any number and combination of other power module cluster(s) 300 and/or other power module(s) 12 (i.e., which are electrically connected to the respective bi-directional AC/DC converter 302 via the AC electrical power bus 306 and which are not connected to the respective bi-directional AC/DC converter 302 via the DC electrical power bus 308), an electrical power utility grid 316, and/or an auxiliary electrical power storage unit 500 as described further herein with reference to FIGS. 3-5. The bi-directional AC/DC inverter 302 may be selectively electrically connectable at the AC end to any number and combination of electrical power sources via the AC electrical power bus 306. The bi-directional AC/DC inverter 302 may be selectively electrically connectable at the DC end to the power module cluster 300 and/or the power module 12 via the DC electrical power bus 308. An AC electrical power received by the bi-directional AC/DC inverter 302 from one or more electrical power sources may be rectified by the bi-directional AC/DC inverter 302 and supplied to its respective DC electrical power bus 308 as a DC electrical power. A DC electrical power received by the bi-directional AC/DC inverter 302 from the power module cluster 300 and/or the power module 12 via its respective DC electrical power bus 308 may be inverted by the bi-directional AC/DC inverter 302 and supplied to the AC electrical power bus 306 as an AC electrical power. A fuel cell microgrid system may include any number "P" of bi-directional AC/DC inverters 302, each disposed between the AC electrical power bus 306 and its respective DC electrical power bus 308. In some embodiments, a fuel cell microgrid system may include a one-to-one ratio of power module clusters 300 to bi-directional AC/DC inverters 302, such that P=M.

The bi-directional AC/DC inverter 302 may be configured to export DC electrical power (i.e., invert DC electrical power to AC electrical power) in response to an amount of electrical power, such as a measured voltage and/or current, on the DC electrical power bus 308 exceeding a DC electrical power threshold, such as a voltage and/or current threshold. The bi-directional AC/DC inverter 302 may be configured to import AC electrical power (i.e., rectify AC electrical power to DC electrical power) in response to an amount of electrical power on the DC electrical power bus 308 falling short of the DC electrical power threshold. In some embodiments, the DC electrical power threshold may be a voltage and/or current at which equal electrical power supplied from each of the power module clusters 300 may satisfy the load demand of the AC load 312. Therefore, DC electrical power on the DC electrical power bus 308 exceeding the DC electrical power threshold may be electrical power in excess of what the uninterruptable power module 304 may output to the AC load 312 via bus 310. DC electrical power on the DC electrical power bus 308 falling short of the DC electrical power threshold may be electrical power in deficit of what the uninterruptable power module 304 may output to the AC load 312 via bus 310. In some embodiments, the DC electrical power threshold may be a static value based on the electrical configuration of the AC load 312. In some embodiments, the DC electrical power threshold may be a dynamic value based on the load demand of the AC load 312.

The controller 314 may directly measure and/or interpret received signals as the voltage and/or current on the DC electrical power bus 308. For example, the controller 314 may directly measure and/or interpret received signals as the voltage and/or current on the DC electrical power bus 308 at and/or from the bi-directional AC/DC inverter 302. The controller 314 may further compare the voltage and/or current on the DC electrical power bus 308 to the DC electrical power threshold. In response to determining from the comparison that the voltage and/or current on the DC electrical power bus 308 exceeds the DC electrical power threshold, the controller 314 may signal and/or control the bi-directional AC/DC inverter 302 to export DC electrical power. In response to determining from the comparison that the voltage and/or current on the DC electrical power bus 308 falls short the DC electrical power threshold, the controller 314 may signal and/or control the bi-directional AC/DC inverter 302 to import AC electrical power. As such, when DC electrical power on the DC electrical power bus 308 is in excess of what the uninterruptable power module 304 may output to the AC load 312 via bus 310, the excess amount electrical power may be output to the AC electrical power bus 306 from the DC electrical power bus 308. When the DC electrical power on the DC electrical power bus 308 is in deficit of what the uninterruptable power module 304 may output to the AC load 312 via bus 310, the deficit amount of electrical power may be input to the DC electrical power bus 308 from the AC electrical power bus 306.

The control of one or more bi-directional AC/DC inverters 302 may provide sufficient DC electrical power to each of the uninterruptable power modules 304 for each of the uninterruptable power modules 304 to provide an equal amount of AC electrical power to satisfy the load demand of the AC load 312. As such, imbalances in the outputs of the uninterruptable power modules 304 may be balanced by remedying deficits of DC electrical power on any of the DC electrical power busses 308 by importing AC electrical power so that each of the uninterruptable power modules 304 may provide the equal amount of AC electrical power.

The DC electrical power bus 308 may be configured as a common electrical conduit for respective groups of a bi-directional AC/DC inverter 302, a power module cluster 300, and an uninterruptable power module 304. The DC electrical power bus 308 may be configured to transmit DC electrical power between the bi-directional AC/DC inverter 302, the power module cluster 300, and the uninterruptable power module 304 of a respective group. The DC electrical power bus 308 may electrically connect the DC end of each of the bi-directional AC/DC inverter 302 and the input end of the uninterruptable power module 304.

The AC electrical power bus 306 may be configured as a common electrical conduit for the bi-directional AC/DC inverters 302. The AC electrical power bus 306 may be configured to transmit AC electrical power between the bi-directional AC/DC inverters 302. In some embodiments, the AC electrical power bus 306 may be further configured as a common electrical conduit for AC electrical power transmission between the bi-directional AC/DC inverters 302 and the electrical power utility grid 316. In some embodiments, the AC electrical power bus 306 may be further configured as a common electrical conduit for AC electrical power transmission between the bi-directional AC/DC inverters 302, the electrical power utility grid 316, the auxiliary power storage unit 500, and/or an electrical power dissipation unit 502 shown in FIG. 5. The AC electrical power bus 306 may electrically connect the AC ends of the bi-directional AC/DC inverters 302. In some embodiments, the AC electrical power bus 306 may electrically connect the AC ends of the bi-directional AC/DC inverters 302 and the electrical power utility grid 316, the auxiliary power storage unit 500, and/or the electrical power dissipation unit 502.

The load electrical power bus 310 may be configured as a common electrical conduit for the uninterruptable power modules 304. The load electrical power bus 310 may be configured to transmit AC electrical power between the uninterruptable power modules 304 and the AC load 312. The load electrical power bus 310 may electrically connect the AC end of each of the uninterruptable power modules 304 and the AC load 312.

An AC load 312 may be configured to consume electrical power from the fuel cell microgrid system. In various embodiments, electrical power may be provided to a fuel cell microgrid system by any number and combination of a power modules 12 and power module clusters 300. A fuel cell microgrid system may provide electrical power to any number of AC loads 312. A voltage and/or amperage of electrical power required by an AC load 312 may be an electrical power demand of the AC load 312 on the fuel cell microgrid system. In some embodiments, multiple AC loads 312 may require voltage and/or amperage of electrical power to be within specific requirements, and combined these requirements may present an electrical power demand of the AC load 312 on the fuel cell microgrid system.

In some embodiments, the controller 314 may be a central controller 314 configured to communicatively connect to any number and combination of components of the fuel cell microgrid system. In some embodiments, the controller 314 may be multiple dispersed controllers 314 configured to communicatively connect to any number and combination of components of the fuel cell microgrid system. In some embodiments, the controller 314 may be a standalone controller of the fuel cell microgrid system. In some embodiments, the controller 314 may be an integrated controller of any number and combination of components of the fuel cell microgrid system. Any number and combination of the forgoing configurations of the controller 314 may be implemented in a fuel cell microgrid system.

The examples illustrated in FIGS. 3-5 are described for illustrative purposes and are not meant to limit the scope of the claims and disclosures made herein. These examples are described herein in terms of two power module clusters 300 (a first power module cluster 300, e.g., power module cluster 1 in FIGS. 3-5, and a second power module cluster, e.g., power module cluster M in FIGS. 3-5) and their respective DC electrical power busses 308 (a first DC electrical power bus 308 and a second electrical power bus 308), and two bi-directional AC/DC inverters 302 (a first bi-directional AC/DC inverter 302, e.g., bi-directional AC/DC inverter 1 in FIGS. 3-5, and a second bi-directional AC/DC inverter 302, e.g., bi-directional AC/DC inverter P in FIGS. 3-5). However, the examples illustrated and described herein are applicable to any number greater than two power module clusters 300 (e.g., three or more clusters 300) and their respective DC electrical power busses 308 (e.g., three or more buses 308), and/or bi-directional AC/DC inverters 302 (e.g., three or more inverters 302).

FIG. 3 illustrates an example of a fuel cell microgrid system having bi-directional AC/DC inverters 302. The fuel cell microgrid system may include at least a first bi-directional AC/DC inverter 302 and at least a second bi-directional AC/DC inverter 302, each electrically connected between the AC electrical power bus 306 and a respective DC electrical power bus 308. In such embodiments, each bi-directional AC/DC inverter 302 may be configured to export DC electrical power in response to an amount of electrical power on the respective DC electrical power bus 308 exceeding the DC electrical power threshold. Each bi-directional AC/DC inverter 302 may be configured to import AC electrical power in response to an amount of electrical power on the respective DC electrical power bus 308 falling short of the DC electrical power threshold.

As such, as long as one AC/DC inverter 302 is set to export DC electrical power, there may be AC electrical power available on the AC electrical power bus 306 for another AC/DC inverter 302 to import AC electrical power. For example, the first bi-directional AC/DC inverter 302 may configured to export DC electrical power from the first DC electrical power bus 308 in response to DC electrical power on the first DC electrical power bus 308 exceeding the DC electrical power threshold. The first bi-directional AC/DC inverter 302 may receive DC electrical power at a DC end from the first DC electrical power bus 308, invert the DC electrical power to AC electrical power, and output AC electrical power at an AC end to the AC electrical power bus 306. The first bi-directional AC/DC inverter 302 may remain configured to export DC electrical power as long as the DC electrical power on the first DC electrical power bus 308 remains higher than the DC electrical power threshold.

A second power module cluster 300 (e.g., power module cluster M in FIG. 3) having a degraded and/or failed power module 12 (e.g., degraded power module 1), may not be able the generate and output to the second DC electrical power bus 308 sufficient DC electrical power to meet and/or exceed the DC electrical power threshold. In response to DC electrical power on the second DC electrical power bus 308 falling short of the DC electrical power bus threshold, the second bi-directional AC/DC inverter 302 (e.g., inverter P) may be configured to import AC electrical power from the AC electrical power bus 306. The second bi-directional AC/DC inverter 302 may receive AC electrical power at an AC end from the AC electrical power bus 306, rectify the AC electrical power to DC electrical power, and output DC electrical power at a DC end to the second DC electrical power bus 308. The second bi-directional AC/DC inverter 302 may remain configured to import AC electrical power as long as the DC electrical power on the second DC electrical power bus 308 remains below the DC electrical power threshold.

In some embodiments, the fuel cell microgrid system may be electrically connected to an electrical power utility grid 316 via the AC electrical power bus 306. When configured to import AC electrical power from the AC electrical power bus 306, the second bi-directional AC/DC inverter 302 may draw sufficient AC electrical power from the AC electrical power bus 306 to provide sufficient DC electrical power to the second DC electrical power bus 308 so that the DC electrical power on the second DC electrical power bus 308 no longer falls short of the DC electrical power threshold. In some situations, the DC electrical power exported by the first bi-directional AC/DC inverter 302 (e.g., power to inverter 1 from power module cluster 1) and provided as AC electrical power to the AC electrical power bus 306 may be sufficient AC electrical power to satisfy the needs of the second bi-directional AC/DC inverter 302 and second DC electrical power bus 308. In some situations, the DC electrical power exported by the first bi-directional AC/DC inverter 302 and provided as AC electrical power to the AC electrical power bus 306 may be insufficient AC electrical power to satisfy the needs of the second bi-directional AC/DC inverter 302 and second DC electrical power bus 308. In such situations, the second bi-directional AC/DC inverter 302 may supplement the amount of AC electrical power imported from the AC electrical power bus 306 and provided by the first bi-directional AC/DC inverter 302 with AC electrical power from the electrical power utility grid 316 via the AC electrical power bus 306. The second bi-directional AC/DC inverter 302 may draw any amount of AC electrical power from the electrical power utility grid 316 via the AC electrical power bus 306. For example, the amount of AC electrical power drawn from the electrical power utility grid 316 may be a difference between an amount of AC electrical power provided to the AC electrical power bus 306 by the first bi-directional AC/DC inverter 302 and an amount of electrical power needed by the second bi-directional AC/DC inverter 302. In a further example, the amount of AC electrical power drawn from the electrical power utility grid 316 may be all of an amount of AC electrical power needed by the second bi-directional AC/DC inverter 302. For further example, the amount of AC electrical power drawn from the electrical power utility grid 316 and from AC electrical power provided by the first bi-directional AC/DC inverter 302 may be configured as a set ratio of or set amount of AC electrical power from the electrical power utility grid 316 and the first bi-directional AC/DC inverter 302.

FIG. 4 illustrates an example of a fuel cell microgrid system having bi-directional inverters 302 and configured for selective electrical power utility grid isolation. In addition to the descriptions of the examples illustrated in FIG. 3, the fuel cell microgrid system may include a selective electrical connector 400 configured to selectively electrically connect the fuel cell microgrid system via the AC electrical power bus 306 to the electrical power utility grid 316. In some embodiments, the selective electrical connector 400 may be configured to electrically connect the AC electrical power bus 306 to the electrical power utility grid 316 when AC electrical power is available from the electrical power utility grid 316. The selective electrical connector 400 may be configured to electrically disconnect the AC electrical power bus 306 from the electrical power utility grid 316 when AC electrical power is not available from the electrical power utility grid 316. For example, the selective electrical connector 400 may be configured to electrically connect the AC electrical power bus 306 to the electrical power utility grid 316 when AC electrical power is available from the electrical power utility grid 316 during a grid event, such as a power outage. The selective electrical connector 400 may be any type of electromechanical or electronic component (e.g., relay or solid state switch) configured to allow and prevent the flow of electrical power between a first end of the selective electrical connector 400 and a second end of the selective electrical connector 400.

In some embodiment, the selective electrical connector 400 may be controlled by the controller 314. The controller 314 may directly measure and/or interpret received signals as the voltage and/or current available from the electrical power utility grid 316, for example, at and/or from the selective electrical connector 400. The controller 314 may determine whether to open or close the selective electrical connector 400, selectively electrically connecting or disconnecting the AC electrical power bus 306 and the electrical power utility grid 316. In some embodiments, the controller 314 may selectively electrically disconnect the AC electrical power bus 306 and the electrical power utility grid 316 when the controller 314 measures and/or interprets that there is no or negligible AC electrical power available from the electrical power grid utility 316. In some embodiments, the controller 314 may selectively electrically connect the AC electrical power bus 306 and the electrical power utility grid 316 when the controller 314 measures and/or interprets that there is more than no or negligible AC electrical power available from the electrical power grid utility 316.

FIG. 5 illustrates an example of a fuel cell microgrid system having bi-directional inverters 302 and auxiliary electrical power storage and/or electrical power dissipation. In addition to the descriptions of the examples illustrated in FIGS. 3 and 4, the fuel cell microgrid system may include any number and combination of auxiliary electrical power storage units 500 and/or electrical power dissipation units 502. In some embodiments, an auxiliary electrical power storage unit 500 may be any sort of electrical, electrochemical, electromechanical, and/or thermal energy storage unit. For example, an auxiliary electrical power storage unit 500 may be a battery or supercapacitor. In some embodiments, an electrical power dissipation unit 502 may be any sort of electrical, electrochemical, electromechanical, and/or thermal energy dissipation unit. For example, an auxiliary electrical power storage unit 500 may be a resistor load.

In situations where the second bi-directional AC/DC inverter 302 is set to import AC electrical power from the AC electrical bus 306, there may be more AC electrical power on the AC electrical power bus 306 than the second bi-directional AC/DC inverter 302 needs to draw. In situations where the second bi-directional AC/DC inverter 302 is not set to import AC electrical power from the AC electrical power bus 306, there may still be AC electrical power on the AC electrical power bus 306. The excess AC electrical power on the AC electrical power bus 306 may be provided to the AC electrical power bus 306 by the first bi-directional AC/DC inverter 302 set to export DC electrical power from the first DC electrical power bus 308 and/or the electrical power utility grid 316.

An auxiliary electrical power storage unit 500 may be electrically connected to the AC electrical power bus 306. In situations where a charge of the auxiliary electrical power storage unit 500 falls short of a charge capacity threshold, the auxiliary electrical power storage unit 500 may charge using the excess AC electrical power on the AC electrical power bus 306. In situations where the charge of the auxiliary electrical power storage unit 500 meets or exceeds the charge capacity threshold, the auxiliary electrical power storage unit 500 may not charge using the excess AC electrical power on the AC electrical power bus 306. In situations where the second bi-directional AC/DC inverter 302 is set to import AC electrical power from the AC electrical bus 306 and there is insufficient AC electrical power on the AC electrical power bus 306 to satisfy the need for AC electrical power of the second bi-directional AC/DC inverter 302, the auxiliary electrical power storage unit 500 may output AC electrical power to the AC electrical power bus 306. In some embodiments, the auxiliary electrical power storage unit 500 may include a bi-directional AC/DC inverter (not shown) configured to rectify AC electrical power received at an AC end from the AC electrical power bus 306 and provide DC electrical power at a DC end to the auxiliary electrical power storage unit 500. The bi-directional AC/DC inverter may be further configured to convert DC electrical power received at the DC end from the auxiliary electrical power storage unit 500 and provide AC electrical power at the AC end to the AC electrical power bus 306.

In some embodiment, the auxiliary electrical power storage unit 500 may be controlled by the controller 314. The controller 314 may directly measure and/or interpret received signals as the voltage and/or current available from the AC electrical power bus 306 and the auxiliary electrical power storage unit 500, for example, at and/or from the auxiliary electrical power storage unit 500. The controller 314 may further compare the voltage and/or current of the auxiliary electrical power storage unit 500 to the charge capacity threshold. In response to determining from the comparison that the voltage and/or current of the auxiliary electrical power storage unit 500 meets or exceeds the charge capacity threshold when there is a deficit of AC electrical power on the AC electrical power bus 306, the controller 314 may signal and/or control the auxiliary electrical power storage unit 500 to export DC electrical power. In response to determining from the comparison that the voltage and/or current of the auxiliary electrical power storage unit 500 falls short of the charge capacity threshold when there is excess AC electrical power on the AC electrical power bus 306, the controller 314 may signal and/or control the auxiliary electrical power storage unit 500 to import AC electrical power.

The electrical power dissipation unit 502 may be electrically connected to the AC electrical power bus 306. In situations where the selective electrical connector 400 is open (i.e., the AC electrical power bus 306 is not electrically connected to the power grid 316) and there is excess AC electrical power on the AC electrical power bus 306 (i.e., in excess of the power demand of the auxiliary electrical power storage unit 500 and/or the bi-directional AC/DC inverters 302), the excess AC electrical power is dissipated by the electrical power dissipation unit 502.

In some embodiments, the electrical power dissipation unit 502 may be a passive device configured to dissipate AC electrical power received from the AC electrical power bus 306. In some embodiment, the electrical power dissipation unit 502 may be an active device controlled by the controller 314. The controller 314 may directly measure and/or interpret received signals as the voltage and/or current available from the AC electrical power bus 306, for example, at and/or from the electrical power dissipation unit 502. In response to excess AC electrical power on the AC electrical power bus 306, the controller 314 may control and/or signal the electrical power dissipation unit 502 to dissipate the excess AC electrical power.

Figure 6:
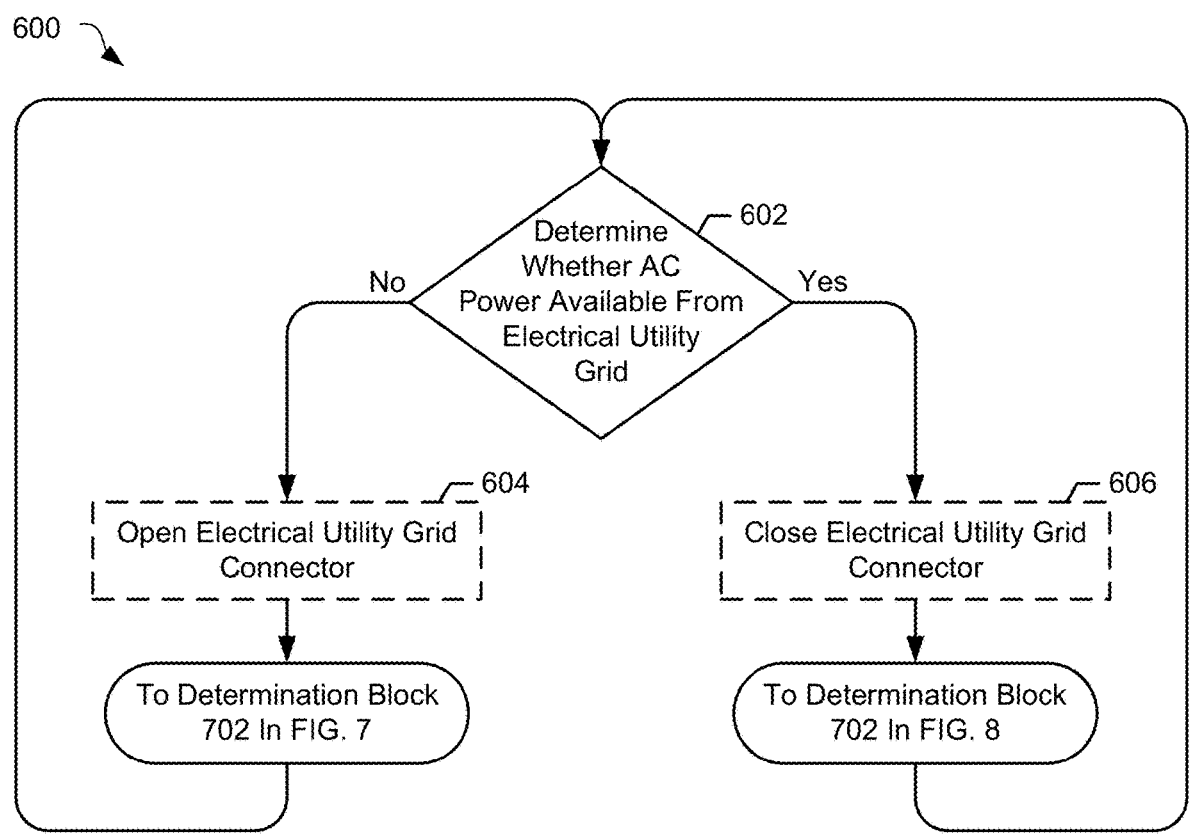
FIG. 6 is a process flow diagram for managing a fuel cell microgrid system according to some embodiments.

FIG. 6 illustrates a method 600 for managing a fuel cell microgrid system of FIGS. 4 and/or 5 according to various embodiments. The method 600 may be implemented using one or more controllers 314 configured to receive signals from and/or send control signals to any number or combination of bi-directional AC/DC inverters 302, AC electrical power busses 306, and/or selective electrical connector 400. In order to encompass the alternative configurations provided in various embodiments, the hardware implementing the method 600 is referred to herein as a "control device."

In determination block 602, the control device may determine whether AC electrical power is available from an electrical power utility grid 316. The control device may directly measure and/or interpret received signals as the voltage and/or current available from the electrical power utility grid 316, for example, at and/or a from bi-directional AC/DC inverter 302, an AC electrical power bus 306, and/or a selective electrical connector 400. If the control device measures and/or interprets that there is no or negligible AC electrical power available from the electrical power utility grid 316, the control device determines that there is not AC electrical power available from the electrical power grid utility 316. If the control device measures and/or interprets that there is more than no or negligible AC electrical power available from the electrical power grid utility 316, then the control device determines that there is AC electrical power available from the electrical power grid utility 316.

In response to determining that there is not AC electrical power available from the electrical power grid utility 316 (i.e., determination block 602="No"), the control device may open the selective electrical connector 400 in optional block 604. Opening the selective electrical connector 400 may selectively electrically disconnect a fuel cell microgrid system from the electrical power utility grid 316. For example, opening the selective electrical connector 400 may selectively electrically disconnect the AC electrical power bus 306 of the fuel cell microgrid system from the electrical power utility grid 316. The control device may control and/or signal to the selective electrical connector 400 to open.

Figure 7:
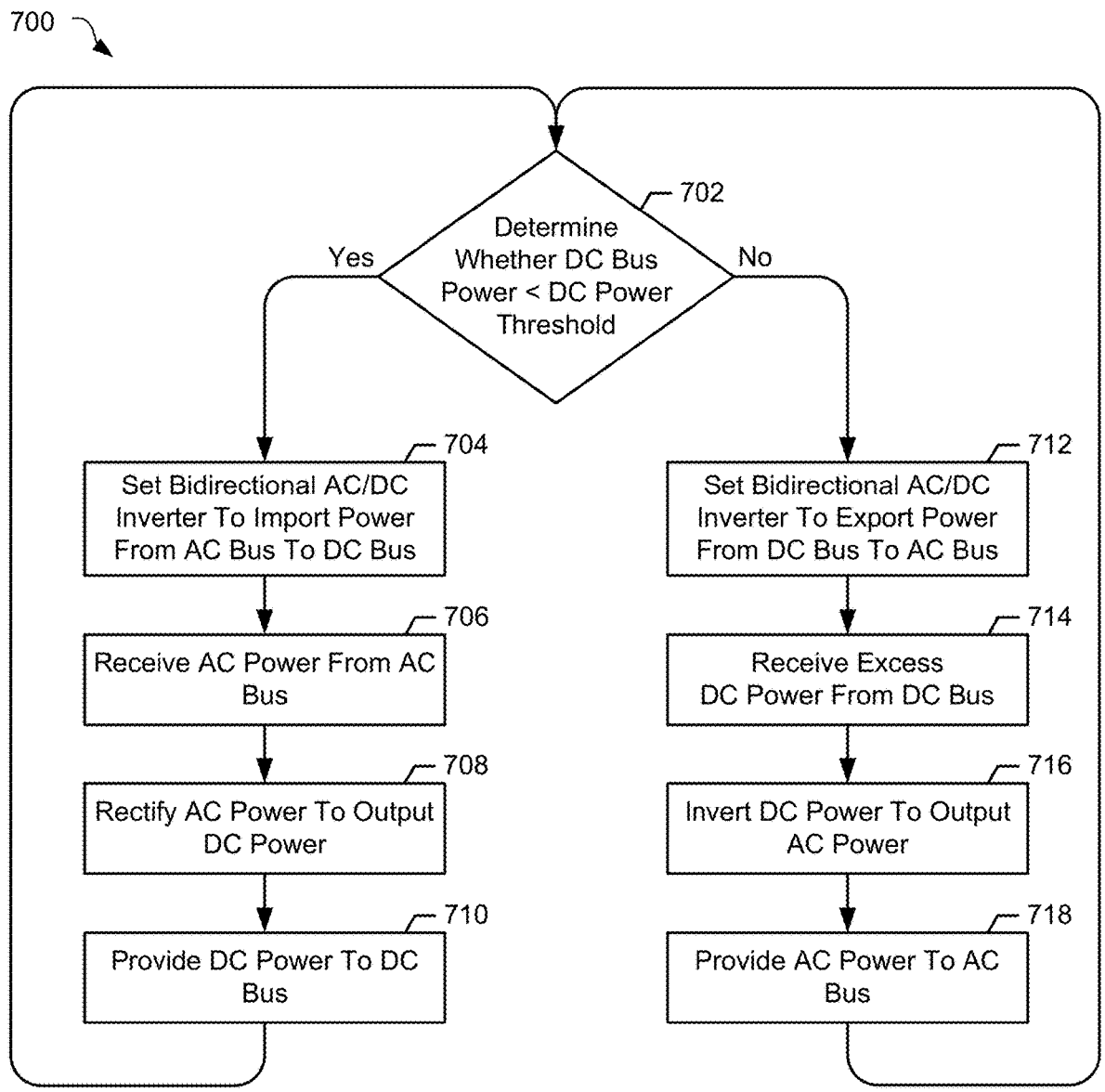
FIG. 7 is a process flow diagram for managing a fuel cell microgrid system according to some embodiments.

In response to determining that there is not AC electrical power available from the electrical power grid utility 316 (i.e., determination block 602="No"), or following opening the selective electrical connector 400 in optional block 604, the control device may implement determination block 702 of the method 700 described further herein with reference to FIG. 7.

In response to determining that there is AC electrical power available from the electrical power grid utility 316 (i.e., determination block 602="Yes"), the control device may close the selective electrical connector 400 in optional block 606. Closing the selective electrical connector 400 may selectively electrically connect the fuel cell microgrid system to the electrical power utility grid 316. For example, closing the selective electrical connector 400 may selectively electrically connect the AC electrical power bus 306 of the fuel cell microgrid system to the electrical power utility grid 316. The control device may control and/or signal to the selective electrical connector 400 to close.

Figure 8:
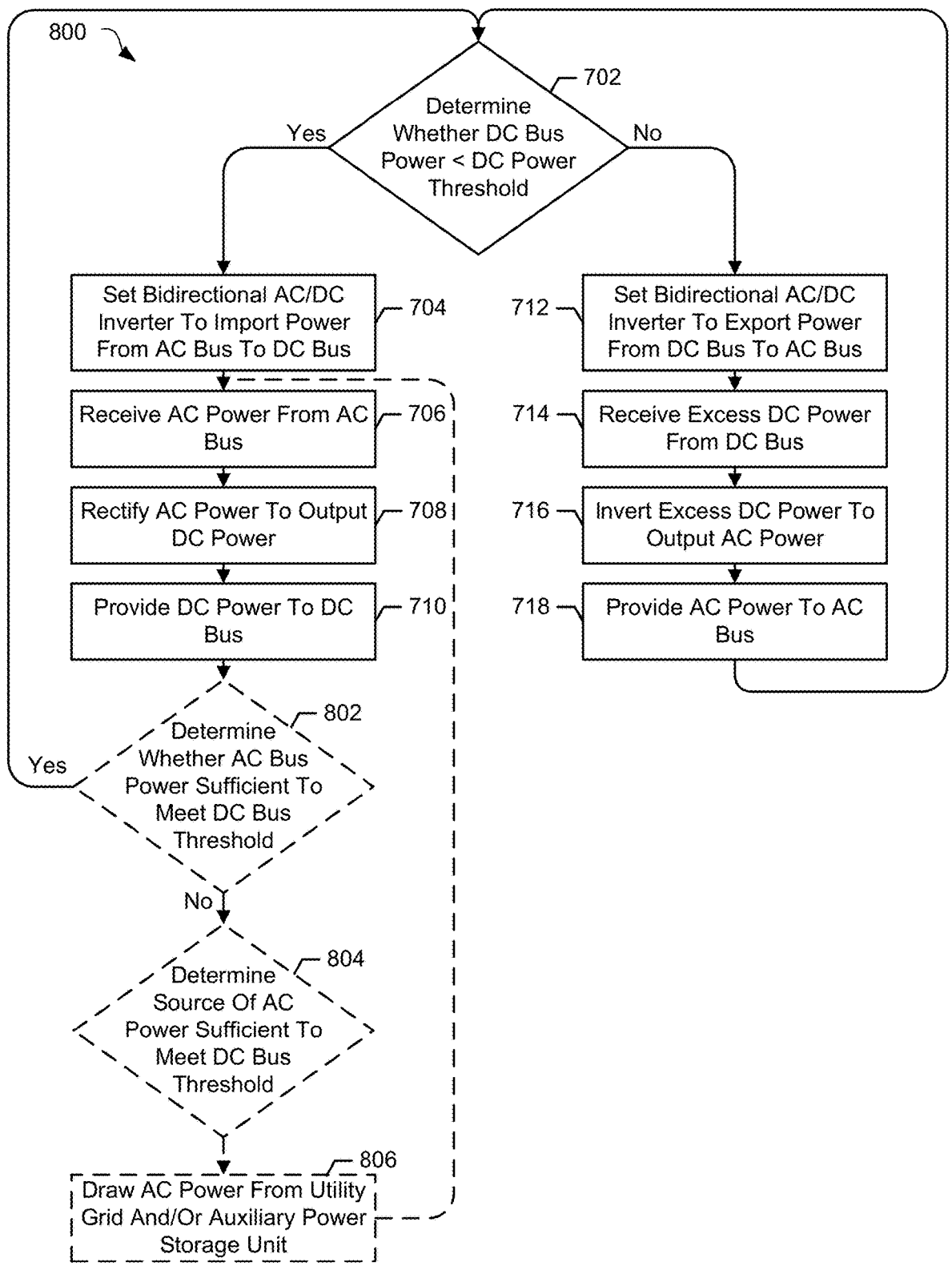
FIG. 8 is a process flow diagram for managing a fuel cell microgrid system according to some embodiments.

In response to determining that there is AC electrical power available from the electrical power grid utility 316 (i.e., determination block 602="Yes"), or following closing the selective electrical connector 400 in optional block 606, the control device may implement determination block 702 of the method 800 described further herein with reference to FIG. 8.

FIG. 7 illustrates a method 700 for managing a fuel cell microgrid system in grid independent mode (i.e., when the selective electrical connector 400 is open or if the microgrid is not electrically connected to electrical power utility grid) according to various embodiments. The method 700 may be implemented using one or more controllers 314 configured to receive signals from and/or send control signals to any number or combination of bi-directional AC/DC inverters 302, uninterruptable power modules 304, AC electrical power busses 306, and/or DC electrical power busses 308. In order to encompass the alternative configurations provided in various embodiments, the hardware implementing the method 700 is referred to herein as a "control device."

In determination block 702, the control device may determine whether the DC electrical power, i.e., voltage and/or current, on a DC electrical power bus 308 falls short of a DC electrical power threshold, such as a voltage and/or current threshold. In some embodiments, the DC electrical power threshold may be a voltage and/or current at which equal electrical power supplied from each of the power module clusters 300 may satisfy the load demand of the AC load 312. The control device may directly measure and/or interpret received signals as the voltage and/or current on the DC electrical power bus 308. For example, the control device may directly measure and/or interpret received signals as the voltage and/or current on the DC electrical power bus 308 at and/or from a bi-directional AC/DC inverter 302. The control device may further compare the voltage and/or current on the DC electrical power bus 308 to the DC electrical power threshold.

In response to determining that the DC electrical power on the DC electrical power bus 308 falls short of the DC electrical power threshold (i.e., determination block 702="Yes"), the control device may set the bi-directional AC/DC inverter 302 to import AC electrical power from the AC electrical power bus 306 in block 704. The control device may signal and/or control the bi-directional AC/DC inverter 302 to import AC electrical power.

In block 706, the bi-directional AC/DC inverter 302 may receive AC electrical power at its AC end from the AC electrical power bus 306. In some embodiments, the bi-directional AC/DC inverter 302 may be configured to draw a desired amount of AC electrical power from the AC electrical power bus 306. In some embodiments, the amount of AC electrical power to draw from the AC electrical power bus 306 may be predetermined and configured based on the DC electrical power threshold. In some embodiments, the amount of AC electrical power to draw from the AC electrical power bus 306 may be configurable based on the DC electrical power threshold and the amount of DC electrical power on the DC electrical power bus, such as a comparative value between the DC electrical power threshold and the amount of DC electrical power on the DC electrical power bus 308. In some embodiments, the control device may determine the amount of AC electrical power to draw from the AC electrical power bus 306 and/or control and/or signal to the bi-directional AC/DC inverter 302 regarding the amount of AC electrical power to draw from the AC electrical power bus 306.

In block 708, the bi-directional AC/DC inverter 302 may rectify the received AC electrical power. The bi-directional AC/DC inverter 302 may rectify the AC electrical power to DC electrical power. In block 710, the bi-directional AC/DC inverter 302 may provide the DC electrical power to the DC electrical power bus 308.

In response to determining that the DC electrical power on the DC electrical power bus 308 does not fall short of the DC electrical power threshold (i.e., determination block 702="No"), the control device may set the bi-directional AC/DC inverter 302 to export excess DC electrical power (i.e., the amount of DC electrical power above the DC electrical power threshold) from the DC electrical power bus 308 in block 712. In some embodiments, the control device may set the bi-directional AC/DC inverter 302 to export the excess DC electrical power from the DC electrical power bus 308 in response to the DC electrical power on the DC electrical power bus 308 exceeding of the DC electrical power threshold. In other words, in some embodiments, the DC electrical power on the DC electrical power bus 308 may exceed, not just meet, the DC electrical power threshold for the control device to set the bi-directional AC/DC inverter 302 to export DC electrical power from the DC electrical power bus 308. The control device may signal and/or control the bi-directional AC/DC inverter 302 to export DC electrical power.

In block 714, the bi-directional AC/DC inverter 302 may receive at its DC end the excess DC electrical power from the DC electrical power bus 308. In some embodiments, the bi-directional AC/DC inverter 302 may be configured to draw an amount of the excess DC electrical power from the DC electrical power bus 308. In some embodiments, the amount of the excess DC electrical power to draw from the DC electrical power bus 308 may be predetermined and configured based on the DC electrical power threshold. In some embodiments, the amount of excess DC electrical power to draw from the DC electrical power bus 308 may be configurable based on the DC electrical power threshold and the amount of DC electrical power on the DC electrical power bus 308, such as a comparative value between the DC electrical power threshold and the amount of DC electrical power on the DC electrical power bus 308. In some embodiments, the control device may determine the amount of the excess DC electrical power to draw from the DC electrical power bus 308 and/or control and/or signal to the bi-directional AC/DC inverter 302 the amount of DC electrical power to draw from the DC electrical power bus 308.

In block 716, the bi-directional AC/DC inverter 302 may invert the received excess DC electrical power to AC electrical power. In block 718, the bi-directional AC/DC inverter 302 may provide the AC electrical power to the AC electrical power bus 306.

FIG. 8 illustrates a method 800 for managing fuel cell microgrid system in a grid connected configuration (i.e., when the microgrid is electrically connected to the electrical power utility grid 316) according to various embodiments. The method 800 may be implemented using one or more controllers 314 configured to receive signals from and/or send control signals to any number or combination of bi-directional AC/DC inverters 302, AC electrical power busses 306, DC electrical power busses 308, and/or auxiliary electrical power storage units 500. In order to encompass the alternative configurations provided in various embodiments, the hardware implementing the method 800 is referred to herein as a "control device." Blocks 702-718 may be implemented in a similar manner as described herein with reference to like reference numbers of the method 700 with reference to FIG. 7, and will not be described again.

Following providing the DC electrical power to the DC electrical power bus 308 in block 710, the control device may determine whether the AC electrical power on the AC electrical power bus 306 (e.g., power provided from the other power module cluster(s) 310 via the other inverter(s) 302 and/or from the optional storage device 500) is sufficient to rectify to DC electrical power and meet the DC electrical power threshold in optional determination block 802. In some embodiments, the controller 314 may directly measure and/or interpret received signals as the voltage and/or current available from the AC electrical power bus 306, for example, at and/or from the bi-directional AC/DC inverter 302. The control device may calculate whether rectifying an amount of AC electrical power available on the AC electrical power bus 306 provides sufficient DC electrical power to the DC electrical power bus 308 to meet the DC electrical power threshold. In some embodiments, the controller 314 may directly measure and/or interpret received signals as the voltage and/or current available from the DC electrical power bus 308, for example, at and/or from the bi-directional AC/DC inverter 302. The control device may determine whether the DC electrical power provided by the bi-directional AC/DC electrical inverter 302, by rectifying an amount of AC electrical power available on the AC electrical power bus 306, provides sufficient DC electrical power to the DC electrical power bus 308 to meet the DC electrical power threshold. The control device may compare the calculated and/or provided DC electrical power to the DC electrical power threshold to determine whether the AC electrical power on the AC electrical power bus 306 is sufficient to meet the DC electrical power threshold.

In response to determining that the AC electrical power on the AC electrical power bus 306 is sufficient to meet the DC electrical power threshold (i.e., optional determination block 802="Yes"), the control device may return to determination block 702 to determine whether the DC electrical power on a DC electrical power bus 308 falls short of the DC electrical power threshold in determination block 702. In response to determining that the AC electrical power on the AC electrical power bus 306 is not sufficient to meet the DC electrical power threshold (i.e., optional determination block 802="No"), the control device may proceed to optional determination block 804.

In the optional determination block 804, the control device may determine a source of AC electrical power to meet the DC electrical power threshold. For example, the control device may determine whether sufficient AC electrical power is available from the electrical power utility grid 316 and/or from the auxiliary electrical power storage unit 500. The control device then returns to block 706.

Figure 9:
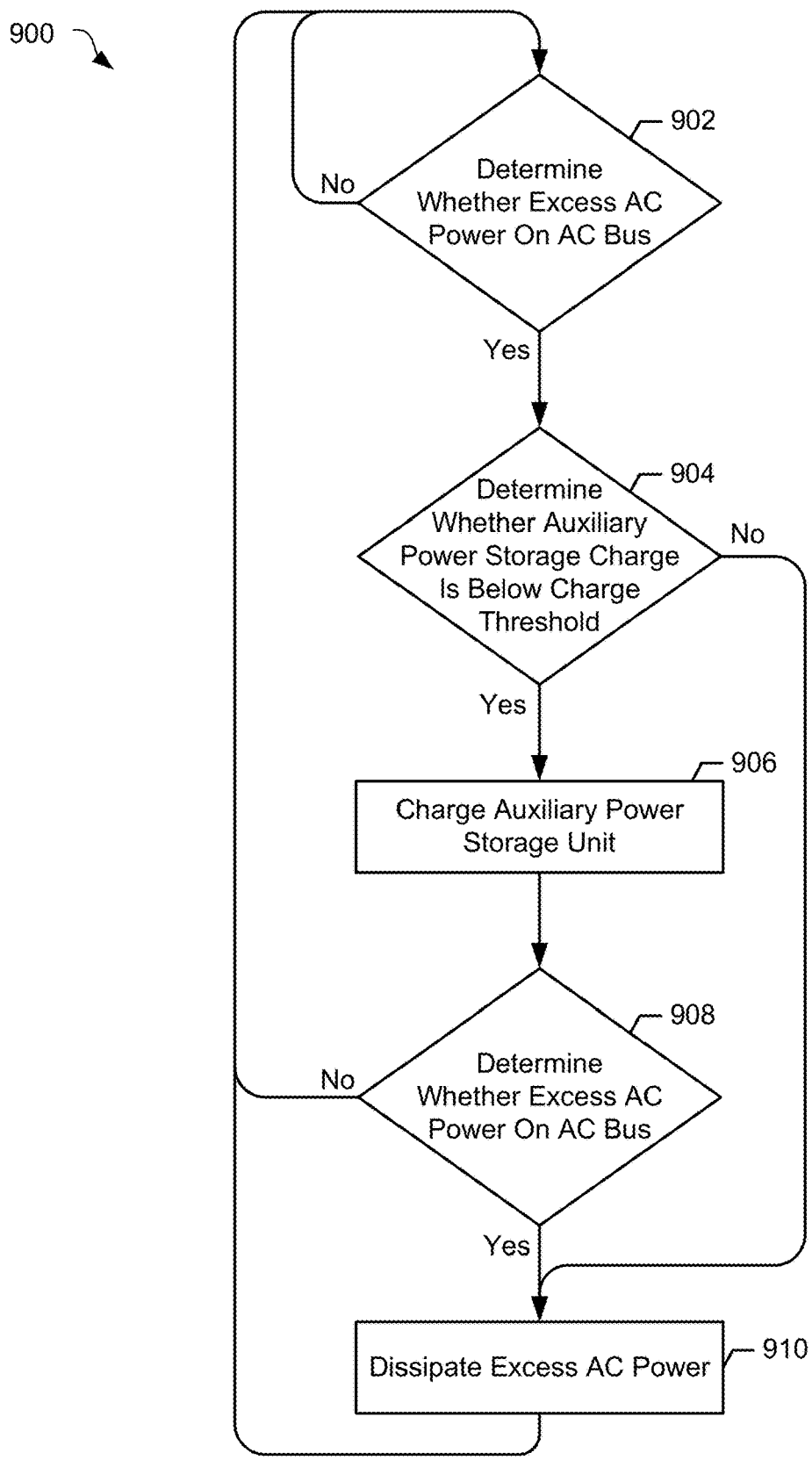
FIG. 9 is a process flow diagram for managing a fuel cell microgrid system according to some embodiments.

FIG. 9 illustrates a method 900 for managing the auxiliary electrical power storage units 500, and/or electrical power dissipation units 502 fuel cell microgrid system according to the embodiment illustrated in FIG. 5. The method 900 may be implemented using one or more controllers 314 configured to receive signals from and/or send control signals to any number or combination of bi-directional AC/DC inverters 302, AC electrical power busses 306, auxiliary electrical power storage units 500, and/or electrical power dissipation units 502. In order to encompass the alternative configurations provided in various embodiments, the hardware implementing the method 900 is referred to herein as a "control device."

In determination block 902, the control device may determine (e.g., using methods described above) whether there is excess AC electrical power on the AC electrical power bus 306. Excess AC electrical power may be AC electrical power on the AC electrical power bus 306 in excess of what is needed by the bi-directional AC/DC inverter 302 to provide sufficient DC electrical power to a DC electrical power bus 308 to meet the DC electrical power threshold.

In response to determining that there is excess AC electrical power on the AC electrical power bus 306 (i.e., determination block 902="Yes"), the control device may determine whether a charge of an auxiliary electrical power storage unit 500 is below a charge capacity threshold in determination block 904. The control device may directly measure and/or interpret received signals as the voltage and/or current available from the auxiliary electrical power storage unit 500, for example, at and/or from the auxiliary electrical power storage unit 500. The control device may compare the voltage and/or current of the auxiliary electrical power storage unit 500 to the charge capacity threshold to determine whether the charge of the auxiliary electrical power storage unit 500 is below the charge capacity threshold.

In response to determining that the charge of the auxiliary electrical power storage unit 500 is below the charge capacity threshold (i.e., determination block 904="Yes"), the control device may charge the auxiliary electrical power storage unit 500 in block 906. The control device may signal and/or control the auxiliary electrical power storage unit 500 to import AC electrical power from the AC electrical power bus 306. The auxiliary electrical power storage unit 500 may charge using the excess AC electrical power on the AC electrical power bus 306 from the power module cluster(s) 300 and/or from the grid 316.

In determination block 908, the control device may determine whether there is still excess AC electrical power on the AC electrical power bus 306 after charging the storage unit 500. The control device may determine whether there is excess AC electrical power on the AC electrical power bus 306 in a manner similar as described herein for block 902. In addition, the control device may directly measure and/or interpret received signals as the voltage and/or current available on the AC electrical power bus 306, for example, at and/or from an electrical power dissipation unit 502.

In response to determining that the charge of the auxiliary electrical power storage unit 500 is not below the charge capacity threshold (i.e., determination block 904="No" because the storage unit 500 is fully charged), or in response to determining that there is still excess AC electrical power on the AC electrical power bus 306 after charging the storage unit 500 (i.e., determination block 908="Yes"), the control device may dissipate excess AC electrical power on the AC electrical power bus 306 in block 910 by providing the excess AC electrical power to the electrical power dissipation unit 502.

In response to determining that there is not excess AC electrical power on the AC electrical power bus 306 (i.e., determination block 908="No"), or following dissipating excess AC electrical power on the AC electrical power bus 306 in block 910, the control device may return to determination block 902 to continue to determine whether there is excess AC electrical power on the AC electrical power bus 306 in determination block 902.

The methods and systems of the embodiments of the present disclosure improve power utilization of paralleled power module clusters. For example, if there are two power module clusters 300 each containing five power modules 12, then the DC electrical power which equals to the DC electrical power threshold is provided from all ten power modules 12 to the AC load 312 via the two uninterruptible power modules 304. If the AC/DC inverters 302 are not bi-directional, then when one of the ten power modules 12 (e.g., power module 1 in cluster M) fails, the maximum power available to the AC load 312 from the two power module clusters 300 is 20% less than the DC electrical power threshold because the two uninterruptible power modules 304 are configured to output the same amount of power (e.g., 40% each of the AC load demand). In this case, the additional 20% of the power has to be drawn from the utility grid 316, which means that the power module cluster 300 (e.g., cluster 1) in which all five power modules 12 are operating at the desired power output is underutilized for supplied power to the AC load.

However, by using bi-directional AC/DC inverters 302 of the embodiments of the present disclosure, the power lost from one power module cluster 300 containing the failed power module, can be made up from the other power module cluster 300 in which all power modules are operating at the desired power output. In other words, when one or more power modules 12 fail or degrade in one "weak" power module cluster 300, then that lost power can be diverted from the other "healthy" power module(s) 300 to the "weak" power module clusters 300 though grid parallel inverters 302 without disturbing the paralleled operation of the uninterruptible power modules 304.

In this scenario, the "healthy" power module cluster 300 (e.g., cluster 1) with all of its power modules 12 are operating at the desired power output is making 50% of the microgrid power output which equals to the DC electrical power threshold, while the "weak" power module cluster 300 (e.g., cluster M) is making 40% of the microgrid power output which equals to the DC electrical power threshold. Thus, 5% of the power output of the "healthy" power module cluster 300 is directed to the "weak" power module cluster via the bi-directional AC/DC inverters 302 connected together by the AC power bus 306. In this case, both uninterruptible power modules 304 output 45% of the power demand of the AC load 312.

The two power module clusters 300 may be designed to output more power than 50% of the power demand of the AC load 312. In this case, the lost power can be diverted from the other "healthy" power module 300 to the "weak" power module cluster 300 to satisfy the enter power demand of the AC load 312.

In one embodiment, the amount of power and its direction is controlled by the controller 314 based on the voltages of the DC electrical power buses 308. When the voltage on a particular DC electrical power bus 308 drops below a threshold value, the controller 314 notes the deficiency in power on the given DC electrical power bus 308 and changes the direction of the corresponding bi-directional AC/DC inverter 302 from power export to power import and optionally provides power from the electrical power utility grid 316 and/or the storage unit 500 to the corresponding DC electrical power bus 308 until the voltage on that DC electrical power bus recovers to a desired threshold value. The DC electrical power bus 308 voltage recovery limit automatically determines the amount of power required (if any) from the electrical utility power grid 316 and/or from the storage unit 500. Similarly when the DC electrical power bus 308 voltage increases, then the bi-direction AC/DC inverter 302 changes its power direction to export and start increasing the export power until the DC electrical power bus 308 voltage reaches a desired value.

In some embodiments, the methods 600, 700, 800, 900 may be implemented in series and/or in parallel. The methods 600, 700, 800, 900 may be periodically, repetitively, and/or continuously implemented.

According to one embodiment, a microgrid system includes a first direct current (DC) power source 300 (e.g., cluster 1) electrically connected to a first DC electrical power bus 308, a second DC power source 300 (e.g., cluster M) electrically connected to a second DC electrical power bus 308, a first uninterruptable power module 304 (e.g., module 1) electrically connected to the first DC electrical power bus 308 and configured to be connected to an alternating current (AC) load 312, a second uninterruptable power module 304 (e.g., module Q) electrically connected to the second DC electrical power bus 308 and configured to be connected to the AC load 312, a first bi-directional AC/DC inverter 302 (e.g., inverter 1) having a DC end and an AC end, wherein the first DC electrical power bus 308 is connected to the DC end of the first bi-directional AC/DC inverter 302, a second bi-directional AC/DC inverter 302 (e.g., inverter P) having a DC end and an AC end, wherein the second DC electrical power bus 308 is connected to the DC end of the second bi-directional AC/DC inverter 302, and an AC electrical power bus 306 electrically connected to the first and the second bi-directional AC/DC inverters 302 at their AC ends.

In one embodiment, the microgrid system further comprises a control device (e.g., controller) 314 configured with control device executable code configured to cause the control device to execute operations comprising determining if first DC electrical power output by the first DC power source 300 to the first DC electrical power bus 308 is less than, equal to or greater than a DC electrical power threshold to be provided to the first uninterruptable power module 304, and in response to determining that the first DC electrical power is less than the DC electrical power threshold, importing supplemental AC electrical power from the AC electrical power bus 306 by the first bi-directional AC/DC inverter 302, and providing a second DC electrical power from the first bi-directional AC/DC inverter 302 to the first DC electrical power bus 308, such that the first DC electrical power and the second DC electrical power are not less than then below the DC electrical power threshold.

In one embodiment, the control device 314 is configured with control device executable code configured to cause the control device to execute operations such that in response to determining that the first DC electrical power is less than the DC electrical power threshold, providing a portion of a DC electrical power output by the second DC power source 300 to the second bi-directional inverter 302 though the second DC electrical power bus 308, and providing a supplemental AC power from the second bi-directional AC/DC inverter 302 to the AC electrical power bus 306.

In one embodiment, the control device 314 is configured with control device executable code configured to cause the control device to execute operations such that in response to determining that the first DC electrical power is greater than the DC electrical power threshold, providing excess DC electrical power which exceeds DC electrical power threshold to the first bi-directional AC/DC inverter 302, converting the excess DC electrical power to additional AC electrical power in the first bi-directional AC/DC inverter 302, and exporting the additional AC electrical power to the AC power bus 306.

In one embodiment, a selective electrical connector 400 is electrically connected to the AC electrical power bus 306 and electrically connectable to an electrical power utility grid 306. The control device 316 is configured with control device executable code configured to cause the control device to execute operations further comprising determining whether AC electrical power is available from the electrical power utility grid 316, and selectively electrically disconnecting the AC electrical power bus 306 from the electrical power utility grid 316 by opening the selective electrical connector 400 in response to determining that AC electrical power is not available from the electrical power utility grid.

In one embodiment, the control device 314 is configured with control device executable code configured to cause the control device to execute operations further comprising in response to determining that the first DC electrical power is less than the DC electrical power threshold: determining whether the supplemental AC electrical power on the AC electrical power bus 306 is sufficient to meet the DC electrical power threshold, and drawing additional AC electrical power from at least one of the electrical power utility grid 316 or the auxiliary electrical power storage unit 500 by the first bi-directional AC/DC inverter 302 in response to determining that the supplemental AC electrical power on the AC electrical power bus 306 is not sufficient to meet the DC electrical power threshold.

In one embodiment, the control device 314 is configured with control device executable code configured to cause the control device to execute operations further comprising determining whether excess AC electrical power is provided on the AC electrical power bus 306, determining whether a charge of the auxiliary electrical power storage unit 500 exceeds a charge threshold, and charging the auxiliary electrical power storage unit 500 using the excess AC electrical power from the AC electrical power bus 306 in response to determining that there is excess AC electrical power on the AC electrical power bus and that the charge of the auxiliary electrical power storage unit 500 does not exceed the charge threshold.

In one embodiment, the control device 314 is configured with control device executable code configured to cause the control device to execute operations further comprising determining whether there is excess AC electrical power on the AC electrical power bus 306 after charging the auxiliary electrical power storage unit 500 and whether the electrical power utility grid 316 is electrically connected to the AC electrical power bus 306, and dissipating the excess AC electrical power from the AC electrical power bus by an electrical power dissipation unit 502 in response to determining that there is excess AC electrical power on the AC electrical power bus and that the electrical power utility grid 315 is not electrically connected to the AC electrical power bus 306.

In one embodiment, the first DC power source 300 comprises a first fuel cell power module cluster comprising a plurality of first fuel cell power modules 12, the second DC power source 300 comprises a second fuel cell power module cluster comprising a plurality of second fuel cell power modules 12, the first DC electrical power is less than the DC electrical power threshold when at least one first fuel cell power module 12 fails or degrades. The first and the second uninterruptable power modules 304 comprise unidirectional DC/AC inverters. The control device 314 is configured with control device executable code configured to cause the control device to execute operations such that the first and the second uninterruptable power modules 304 provide a same amount of AC electrical power to the AC load 312.

Figure 10:
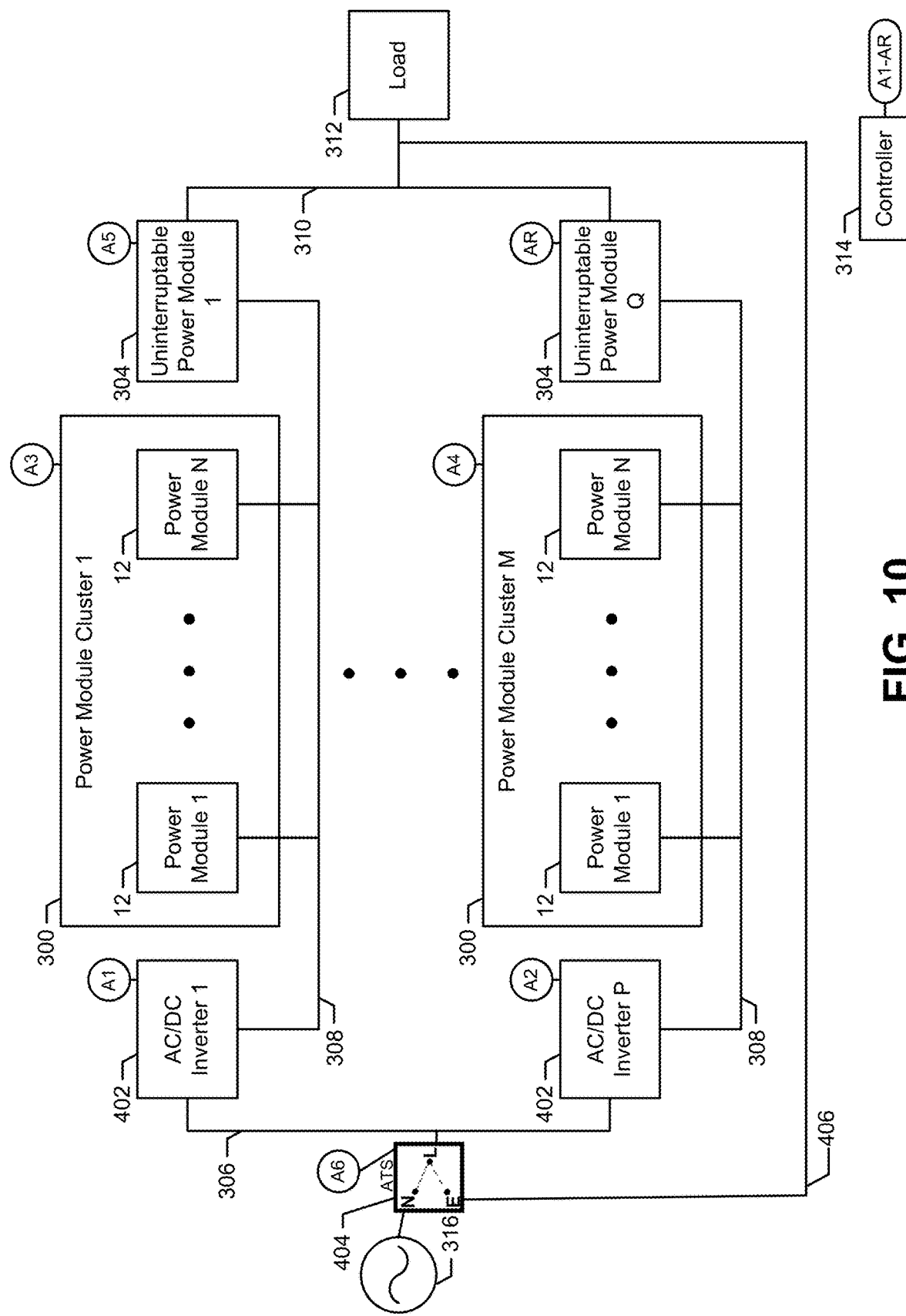
FIG. 10 is a block diagram of a fuel cell microgrid system having inverters and an ATS configured for selective electrical power utility grid isolation according to some embodiments.

FIG. 10 illustrates an example of a fuel cell microgrid system having inverters 402 and a selective electrical connector which comprises an automatic transfer switch (ATS) 404. In addition to the descriptions of the examples illustrated in FIGS. 3 and 4, the fuel cell microgrid system includes the ATS 404 and an additional AC electrical power bus 406. In this embodiment, the inverters 402 may be either bi-directional inverters as described above or unidirectional inverters which are configured to invert the DC electrical power from the power module cluster 300 to the AC electrical power bus 306. The electrical power utility grid 316 is connected to the normal (N) terminal of the ATS 404, the AC electrical power bus 306 is connected to the load (L) terminal of the ATS 404, and a first end of the additional AC electrical power bus 406 is connected to the emergency (E) terminal of the ATS 404. The second end of the additional AC electrical power bus 406 is connected to the load electrical power bus 310.

In this mode of operation, when the electrical power utility grid stops supplying electrical power (i.e., is "lost") on the normal (N) terminal of the ATS 404, a standalone voltage source (e.g., load 312 connected to the load electrical power bus 310) is present on the ATS emergency (E) terminal via the additional AC electrical power bus 406. This causes the ATS 404 to change position (i.e., connecting the load (L) terminal to the emergency (E) terminal), which connects the inverters 402 directly to the load 312 via the additional AC electrical power bus 406 and the load electrical power bus 310. With this connection, the inverters 402 can export as a current source to offset the load 312 from the uninterruptable power modules 304.

As shown, uninterruptable power modules 304 still carry equal power, but the excess power available in the first inverter 402 is able to reach the load 312. If bidirectional inverters 302 (instead of unidirectional inverters 402) are used, the power can still flow through the second bi-directional inverter (P) 302 as described in FIGS. 4 and 5. Furthermore, in the embodiment of FIG. 10, the auxiliary power storage unit 500, and/or an electrical power dissipation unit 502 may be optionally connected to the AC electrical power bus 306, as shown in FIG. 5.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements, including the control device 301 as well as connected controllers described herein, may be implemented using computing devices (such as computer) that include programmable processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The hardware used to implement the various illustrative logics, logical blocks, modules, and circuits described in connection with the aspects disclosed herein may be implemented or performed with a control device that may be or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use any of the described embodiments. Various modifications to these embodiments will be readily apparent to those skilled in the art, and the generic principles defined herein may be applied to other embodiments without departing from the scope of the disclosure. Thus, the claims are not intended to be limited to the embodiments shown herein but are to be accorded the widest scope consistent with the claim language and the principles and novel features disclosed herein.

What is claimed is:

1. A microgrid system, comprising:
    a first direct current (DC) power source electrically connected to a first DC electrical power bus;
    a second DC power source electrically connected to a second DC electrical power bus;
    a first uninterruptable power module electrically connected to the first DC electrical power bus and configured to be connected to an alternating current (AC) load;
    a second uninterruptable power module electrically connected to the second DC electrical power bus and configured to be connected to the AC load;
    a first bi-directional AC/DC inverter having a DC end and an AC end, wherein the first DC electrical power bus is connected to the DC end of the first bi-directional AC/DC inverter;
    a second bi-directional AC/DC inverter having a DC end and an AC end, wherein the second DC electrical power bus is connected to the DC end of the second bi-directional AC/DC inverter;
    an AC electrical power bus electrically connected to the first and the second bi-directional AC/DC inverters at their AC ends; and
    a control device communicatively connected to the first bi-directional AC/DC inverter and the second bi-directional AC/DC inverter and configured with control device executable code configured to cause the control device to execute operations comprising:
        configuring the second bi-directional AC/DC inverter to provide supplemental AC power to the AC electrical power bus; and
        configuring the first bi-directional AC/DC inverter to import at least part of the supplemental AC electrical power from the AC electrical power bus.

2. The microgrid system of claim 1, wherein the control device configured with control device executable code configured to cause the control device to execute operations further comprising:
    determining if first DC electrical power output by the first DC power source to the first DC electrical power bus is less than, equal to or greater than a DC electrical power threshold to be provided to the first uninterruptable power module; and
    in response to determining that the first DC electrical power is less than the DC electrical power threshold, importing the supplemental AC electrical power from the AC electrical power bus by the first bi-directional AC/DC inverter, and providing a second DC electrical power from the first bi-directional AC/DC inverter to the first DC electrical power bus, such that the first DC electrical power and the second DC electrical power are not less than the DC electrical power threshold.

3. The microgrid system of claim 2, wherein the control device is configured with control device executable code configured to cause the control device to execute operations such that:
    in response to determining that the first DC electrical power is less than the DC electrical power threshold, providing a portion of a DC electrical power output by the second DC power source to the second bi-directional inverter though the second DC electrical power bus; and
    providing the supplemental AC power from the second bi-directional AC/DC inverter to the AC electrical power bus.

4. The microgrid system of claim 3, wherein the control device is configured with control device executable code configured to cause the control device to execute operations such that:
    in response to determining that the first DC electrical power is greater than the DC electrical power threshold, providing excess DC electrical power which exceeds DC electrical power threshold to the first bi-directional AC/DC inverter;
    converting the excess DC electrical power to additional AC electrical power in the first bi-directional AC/DC inverter; and
    exporting the additional AC electrical power to the AC power bus.

5. The microgrid system of claim 3, further comprising a selective electrical connector electrically connected to the AC electrical power bus and electrically connectable to an electrical power utility grid,
    wherein the control device is configured with control device executable code configured to cause the control device to execute operations further comprising:
        determining whether AC electrical power is available from the electrical power utility grid; and
        selectively electrically disconnecting the AC electrical power bus from the electrical power utility grid by opening the selective electrical connector in response to determining that AC electrical power is not available from the electrical power utility grid.

6. The microgrid system of claim 5, further comprising an auxiliary electrical power storage unit,
    wherein the control device is configured with control device executable code configured to cause the control device to execute operations further comprising:
        in response to determining that the first DC electrical power is less than the DC electrical power threshold:
            determining whether the supplemental AC electrical power on the AC electrical power bus is sufficient to meet the DC electrical power threshold; and
            drawing additional AC electrical power from at least one of the electrical power utility grid or the auxiliary electrical power storage unit by the first bi-directional AC/DC inverter in response to determining that the supplemental AC electrical power on the AC electrical power bus is not sufficient to meet the DC electrical power threshold.

7. The microgrid system of claim 6, wherein the control device is configured with control device executable code configured to cause the control device to execute operations further comprising:
- determining whether excess AC electrical power is provided on the AC electrical power bus;
- determining whether a charge of the auxiliary electrical power storage unit exceeds a charge threshold; and
- charging the auxiliary electrical power storage unit using the excess AC electrical power from the AC electrical power bus in response to determining that there is excess AC electrical power on the AC electrical power bus and that the charge of the auxiliary electrical power storage unit does not exceed the charge threshold.

8. The microgrid system of claim 7, further comprising an electrical power dissipation unit electrically connected to the AC electrical power bus,
- wherein the control device is configured with control device executable code configured to cause the control device to execute operations further comprising:
  - determining whether there is excess AC electrical power on the AC electrical power bus after charging the auxiliary electrical power storage unit and whether the electrical power utility grid is electrically connected to the AC electrical power bus; and
  - dissipating the excess AC electrical power from the AC electrical power bus by the electrical power dissipation unit in response to determining that there is excess AC electrical power on the AC electrical power bus and that the electrical power utility grid is not electrically connected to the AC electrical power bus.

9. The microgrid system of claim 2, wherein:
- the first DC power source comprises a first fuel cell power module cluster comprising a plurality of first fuel cell power modules;
- the second DC power source comprises a second fuel cell power module cluster comprising a plurality of second fuel cell power modules; and
- the first DC electrical power is less than the DC electrical power threshold when at least one first fuel cell power module fails or degrades.

10. The microgrid system of claim 2, wherein:
- the first and the second uninterruptable power modules comprise unidirectional DC/AC inverters; and
- the control device is configured with control device executable code configured to cause the control device to execute operations such that the first and the second uninterruptable power modules provide a same amount of AC electrical power to the AC load.

11. A method of operating the microgrid system of claim 1, comprising:
- providing a same amount of AC electrical power to the AC load from the first and the second uninterruptable power modules;
- providing the supplemental AC power from the second bi-directional AC/DC inverter to the AC electrical power bus; and
- importing the at least part of the supplemental AC electrical power from the AC electrical power bus by the first bi-directional AC/DC inverter.

12. The method of operating the microgrid system of claim 11, further comprising:
- determining if a first DC electrical power output by the first DC power source to the first DC electrical power bus is less than, equal to or greater than a DC electrical power threshold to be provided to the first uninterruptable power module; and
- in response to determining that the first DC electrical power is less than the DC electrical power threshold, importing the supplemental AC electrical power from the AC electrical power bus by the first bi-directional AC/DC inverter, and providing a second DC electrical power from the first bi-directional AC/DC inverter to the first DC electrical power bus, such that the first DC electrical power and the second DC electrical power are not less than the DC electrical power threshold.

13. The method of operating the microgrid system of claim 12, further comprising:
- in response to determining that the first DC electrical power is less than the DC electrical power threshold, providing a portion of a DC electrical power output by the second DC power source to the second bi-directional inverter though the second DC electrical power bus, and providing the supplemental AC power from the second bi-directional AC/DC inverter to the AC electrical power bus.

14. The method of operating the microgrid system of claim 13, further comprising:
- in response to determining that the first DC electrical power is greater than the DC electrical power threshold, providing excess DC electrical power which exceeds DC electrical power threshold to the first bi-directional AC/DC inverter;
- converting the excess DC electrical power to additional AC electrical power in the first bi-directional AC/DC inverter; and
- exporting the additional AC electrical power to the AC power bus.

15. The method of operating the microgrid system of claim 13, further comprising:
- determining whether AC electrical power is available from an electrical power utility grid; and
- selectively electrically disconnecting the AC electrical power bus from the electrical power utility grid in response to determining that AC electrical power is not available from the electrical power utility grid.

16. The method of operating the microgrid system of claim 15, further comprising:
- in response to determining that the first DC electrical power is less than the DC electrical power threshold:
  - determining whether the supplemental AC electrical power on the AC electrical power bus is sufficient to meet the DC electrical power threshold; and
  - drawing additional AC electrical power from at least one of the electrical power utility grid or an auxiliary electrical power storage unit by the first bi-directional AC/DC inverter in response to determining that the supplemental AC electrical power on the AC electrical power bus is not sufficient to meet the DC electrical power threshold.

17. The method of operating the microgrid system of claim 16, further comprising:
- determining whether excess AC electrical power is provided on the AC electrical power bus;
- determining whether a charge of the auxiliary electrical power storage unit exceeds a charge threshold; and
- charging the auxiliary electrical power storage unit using the excess AC electrical power from the AC electrical power bus in response to determining that there is excess AC electrical power on the AC electrical power bus and that the charge of the auxiliary electrical power storage unit does not exceed the charge threshold.

18. The method of operating the microgrid system of claim 17, further comprising:
determining whether there is excess AC electrical power on the AC electrical power bus after charging the auxiliary electrical power storage unit and whether the electrical power utility grid is electrically connected to the AC electrical power bus; and
dissipating the excess AC electrical power from the AC electrical power bus in response to determining that there is excess AC electrical power on the AC electrical power bus and that the electrical power utility grid is not electrically connected to the AC electrical power bus.

19. The method of operating the microgrid system of claim 12, wherein:
the first and the second uninterruptable power modules comprise unidirectional DC/AC inverters;
the first DC power source comprises a first fuel cell power module cluster comprising a plurality of first fuel cell power modules;
the second DC power source comprises a second fuel cell power module cluster comprising a plurality of second fuel cell power modules; and
the first DC electrical power is less than the DC electrical power threshold when at least one first fuel cell power module fails or degrades.

20. The method of operating the microgrid system of claim 12, wherein:
the step of determining if first DC electrical power output by the first DC power source to the first DC electrical power bus is less than, equal to or greater than a DC electrical power threshold comprises measuring a voltage on the first DC electrical power bus, and determining if the measured voltage is less than, equal to or greater than a threshold voltage; and
if the measured voltage drops below the threshold voltage, then a current flow direction of the first bi-directional AC/DC inverter changes from power export to power import to provide additional electrical power from the AC electrical power bus to the first DC electrical power bus until the measured voltage on that DC electrical power bus recovers to equal the threshold voltage.

21. A microgrid system, comprising:
a first direct current (DC) power source electrically connected to a first DC electrical power bus;
a second DC power source electrically connected to a second DC electrical power bus;
a first uninterruptable power module electrically connected to the first DC electrical power bus and configured to be connected to an alternating current (AC) load via at least one load electrical power bus;
a second uninterruptable power module electrically connected to the second DC electrical power bus and configured to be connected to the AC load via the at least one load electrical power bus;
a first AC/DC inverter having a DC end and an AC end, wherein the first DC electrical power bus is connected to the DC end of the first AC/DC inverter;
a second AC/DC inverter having a DC end and an AC end, wherein the second DC electrical power bus is connected to the DC end of the second AC/DC inverter;
an automatic transfer switch (ATS) having a load terminal, an emergency terminal, and a normal terminal configured to be connected to an electrical power utility grid;
a first AC electrical power bus electrically connected to the first and the second AC/DC inverters at their AC ends, and electrically connected to the load terminal of the ATS; and
a second AC electrical power bus electrically connected to the emergency terminal of the ATS and to the at least one load electrical power bus.

22. A microgrid system, comprising:
a first direct current (DC) power source electrically connected to a first DC electrical power bus;
a second DC power source electrically connected to a second DC electrical power bus;
a first uninterruptable power module electrically connected to the first DC electrical power bus and configured to be connected to an alternating current (AC) load;
a second uninterruptable power module electrically connected to the second DC electrical power bus and configured to be connected to the AC load;
a first bi-directional AC/DC inverter having a DC end and an AC end, wherein the first DC electrical power bus is connected to the DC end of the first bi-directional AC/DC inverter;
a second bi-directional AC/DC inverter having a DC end and an AC end, wherein the second DC electrical power bus is connected to the DC end of the second bi-directional AC/DC inverter;
an AC electrical power bus electrically connected to the first and the second bi-directional AC/DC inverters at their AC ends;
a control device configured with control device executable code configured to cause the control device to execute operations comprising:
determining if first DC electrical power output by the first DC power source to the first DC electrical power bus is less than, equal to or greater than a DC electrical power threshold to be provided to the first uninterruptable power module; and
in response to determining that the first DC electrical power is less than the DC electrical power threshold:
providing a portion of a DC electrical power output by the second DC power source to the second bi-directional inverter though the second DC electrical power bus;
providing supplemental AC power from the second bi-directional AC/DC inverter to the AC electrical power bus;
importing supplemental AC electrical power from the AC electrical power bus by the first bi-directional AC/DC inverter; and
providing a second DC electrical power from the first bi-directional AC/DC inverter to the first DC electrical power bus, such that the first DC electrical power and the second DC electrical power are not less than the DC electrical power threshold.

23. A method of operating a microgrid system comprising:
a first direct current (DC) power source electrically connected to a first DC electrical power bus;
a second DC power source electrically connected to a second DC electrical power bus;

a first uninterruptable power module electrically connected to the first DC electrical power bus and configured to be connected to an alternating current (AC) load;
a second uninterruptable power module electrically connected to the second DC electrical power bus and configured to be connected to the AC load;
a first bi-directional AC/DC inverter having a DC end and an AC end, wherein the first DC electrical power bus is connected to the DC end of the first bi-directional AC/DC inverter;
a second bi-directional AC/DC inverter having a DC end and an AC end, wherein the second DC electrical power bus is connected to the DC end of the second bi-directional AC/DC inverter; and
an AC electrical power bus electrically connected to the first and the second bi-directional AC/DC inverters at their AC ends,
the method comprising:
providing a same amount of AC electrical power to the AC load from the first and the second uninterruptable power modules;
determining if a first DC electrical power output by the first DC power source to the first DC electrical power bus is less than, equal to or greater than a DC electrical power threshold to be provided to the first uninterruptable power module; and
in response to determining that the first DC electrical power is less than the DC electrical power threshold, importing supplemental AC electrical power from the AC electrical power bus by the first bi-directional AC/DC inverter, and providing a second DC electrical power from the first bi-directional AC/DC inverter to the first DC electrical power bus, such that the first DC electrical power and the second DC electrical power are not less than the DC electrical power threshold.

* * * * *